United States Patent
Masuyama

(10) Patent No.: US 7,467,241 B2
(45) Date of Patent: Dec. 16, 2008

(54) STORAGE CONTROL METHOD AND STORAGE CONTROL SYSTEM

(75) Inventor: Yusuke Masuyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 11/248,304

(22) Filed: Oct. 13, 2005

(65) Prior Publication Data

US 2007/0038748 A1    Feb. 15, 2007

(30) Foreign Application Priority Data

Aug. 5, 2005    (JP)    ............... 2005-227853

(51) Int. Cl.
  G06F 3/00    (2006.01)
  G06F 5/00    (2006.01)
  G06F 15/16    (2006.01)
  G06F 15/173    (2006.01)

(52) U.S. Cl. ............ 710/38; 709/228; 709/229; 709/239; 709/225; 710/62; 711/150

(58) Field of Classification Search ............ 710/62, 710/38; 711/150; 709/225, 228, 229, 239
See application file for complete search history.

(56) References Cited

U.S. PATENT DOCUMENTS

| 5,742,792 | A | * | 4/1998 | Yanai et al. | ............ 711/162 |
| 6,131,148 | A | * | 10/2000 | West et al. | ............ 711/162 |
| 2003/0185064 | A1 | * | 10/2003 | Hirakawa et al. | ............ 365/200 |
| 2004/0103254 | A1 | * | 5/2004 | Satoyama et al. | ............ 711/150 |

FOREIGN PATENT DOCUMENTS

JP    2004-220450    8/2004

* cited by examiner

Primary Examiner—Niketa I Patel
Assistant Examiner—Farley J Abad
(74) Attorney, Agent, or Firm—Mattingly, Stanger, Malur & Brundidge, PC

(57) ABSTRACT

A control system for a plurality of storage systems has at least one path that is selected from a plurality of paths where one of three or more storage systems is a start point storage system and another one thereof is an end point storage system. According to the selected path, the external connection processing for writing data to an external volume which corresponds to a virtual volume, and/or the remote copy processing for writing data to be written in a copy source volume to a copy destination volume, is/are executed at least once. By this, the data received by the start point storage system is written to the logical volume in the end point storage system.

12 Claims, 15 Drawing Sheets

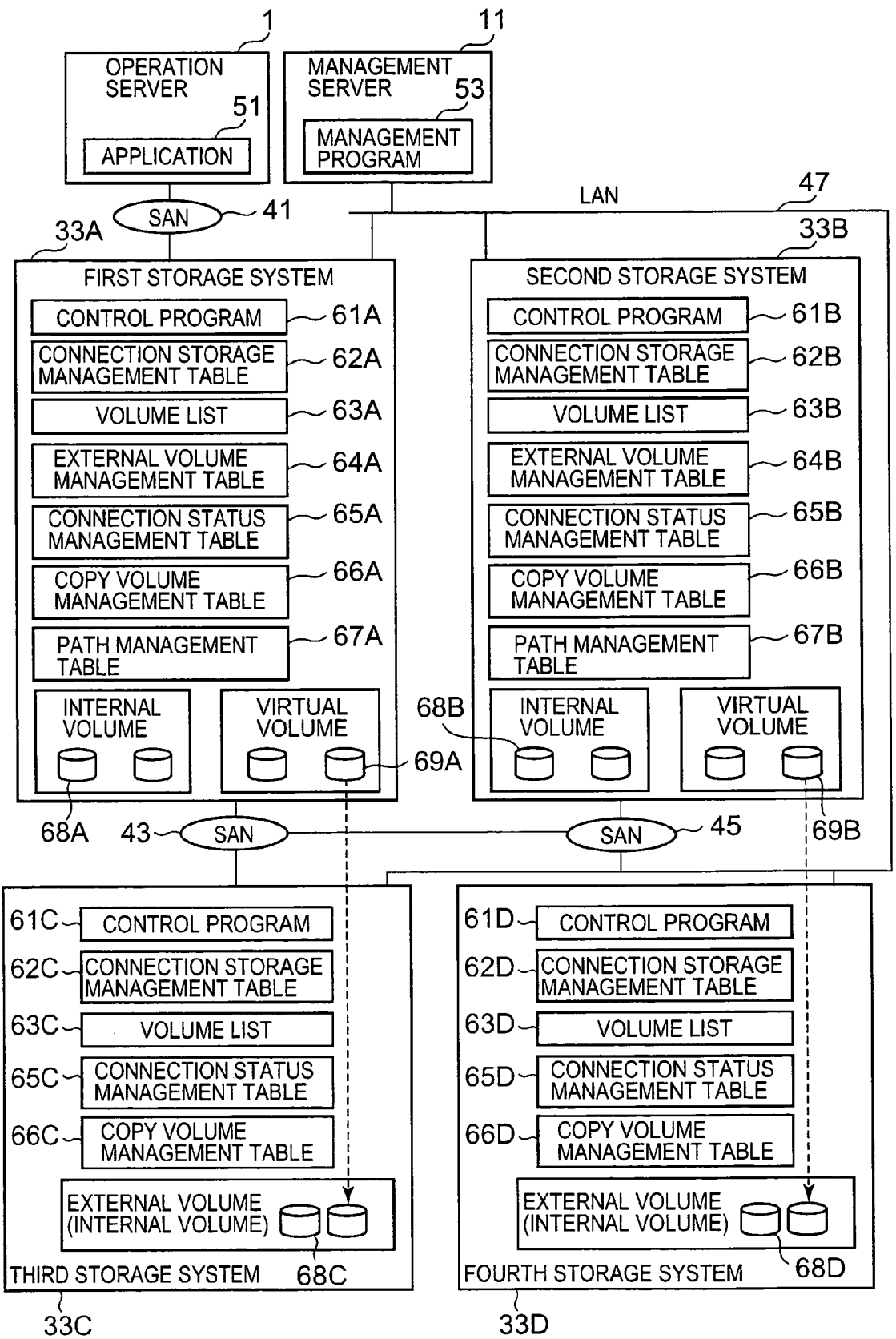

FIG. 4A

| VOLUME ID | VOLUME TYPE | CAPACITY |
|---|---|---|
| 50 | INTERNAL | 100GB |
| ⋮ | ⋮ | ⋮ |

| | CONNECTION DESTINATION STORAGE SYSTEM ID | CONNECTION TYPE |
|---|---|---|
| 1 | 600 | EXTERNAL |
| 2 | 15000 | REMOTE |

| | CONNECTION DESTINATION STORAGE SYSTEM ID | CONNECTION TYPE |
|---|---|---|
| 1 | 650 | EXTERNAL |
| 2 | 10000 | REMOTE |

| | CONNECTION DESTINATION STORAGE SYSTEM ID | CONNECTION TYPE |
|---|---|---|
| 1 | 650 | REMOTE |

| ID | CONNECTION DESTINATION STORAGE SYSTEM ID | CONNECTION TYPE |
|---|---|---|
| 1 | 600 | REMOTE |

| VOLUME ID | CONNECTION DESTINATION STORAGE SYSTEM ID | EXTERNAL VOLUME ID |
|---|---|---|
| 1 | 600 | 10 |
| ⋮ | ⋮ | ⋮ |

FIG. 5A

| VOLUME ID | CONNECTION DESTINATION STORAGE SYSTEM ID | EXTERNAL VOLUME ID |
|---|---|---|
| 5 | 650 | 50 |
| ⋮ | ⋮ | ⋮ |

| PATH ID | SYSTEM ID OF SYSTEM 1 | TYPE BETWEEN 1 AND 2 | SYSTEM ID OF SYSTEM 2 |   |
|---|---|---|---|---|
| 1 | 10000 | REMOTE | 15000 | ---Ⓐ / ---Ⓑ |
| 2 | 10000 | EXTERNAL | 600 | ---Ⓒ |

| | TYPE BETWEEN 2 AND 3 | SYSTEM ID OF SYSTEM 3 |
|---|---|---|
| Ⓐ--- | EXTERNAL | 650 |
| Ⓑ--- | REMOTE | 650 |
| Ⓒ--- | REMOTE | 650 |

| CONNECTION DESTINATION STORAGE SYSTEM ID | CONNECTION STATUS |
|---|---|
| 15000 | NORMAL |
| 600 | NORMAL |

| | COPY SOURCE SYSTEM ID | COPY SOURCE VOLUME ID | COPY DESTINATION SYSTEM ID | |
|---|---|---|---|---|
| 1 | 600 | 10 | 650 | ---Ⓓ / ---Ⓔ |
| ⋮ | ⋮ | ⋮ | ⋮ | ---Ⓕ |

| | COPY DESTINATION VOLUME ID | COPY TYPE / TIMING |
|---|---|---|
| Ⓓ--- | | |
| Ⓔ--- | 50 | REMOTE, SYNCHRONOUS |
| Ⓕ--- | ⋮ | ⋮ |

| | VIRTUAL VOLUME ID | COPY SOURCE SYSTEM ID | COPY SOURCE VOLUME ID |
|---|---|---|---|
| 1 | 1 | 600 | 10 |
| ⋮ | ⋮ | ⋮ | ⋮ |

| COPY DESTINATION SYSTEM ID | COPY DESTINATION VOLUME ID | COPY TYPE / TIMING | OPERATING PATH ID |
|---|---|---|---|
| 650 | 50 | REMOTE, SYNCHRONOUS | 2 |
| ⋮ | ⋮ | ⋮ | ⋮ |

| STORAGE SYSTEM ID | VOLUME ID | DATA |
|---|---|---|

FIG. 6C

| COPY SOURCE SYSTEM ID | COPY SOURCE VOLUME ID | COPY DESTINATION SYSTEM ID | COPY DESTINATION VOLUME ID | PATH ID |
|---|---|---|---|---|

FIG. 6D

| LOCAL SIDE PORT NUMBER OF STORAGE SYSTEM | SYSTEM ID OF REMOTE SIDE STORAGE SYSTEM | PORT NUMBER OF REMOTE SIDE STORAGE SYSTEM |
|---|---|---|

STORAGE CONTROL METHOD AND STORAGE CONTROL SYSTEM

CROSS-REFERENCE TO PRIOR APPLICATION

This application relates to and claims priority from Japanese Patent Application No. 2005-227853, filed on Aug. 5, 2005 the entire disclosure of which is incorporated herein by reference.

BACKGROUND OF THE INVENTION

1. Field of the Invention

The present invention relates to data storage technology, and more particularly to data storage control in a storage control system comprising a plurality of storage systems.

2. Description of the Related Art

The following prior art, for example, is known. That is, a first storage device and a second storage device are inter-connected, and a second storage device and a host computer are inter-connected. A first logical device of the first storage device corresponds to the second logical device of the second storage device. The second logical device can be recognized by the host computer. When a read request, to read the second logical device, is received from the host computer, the second storage device converts the read request into a read request for the first logical device which corresponds to the second logical device, and sends the read request after conversion to the first storage device. When an input/output completion report is received from the first storage device, the second storage device sends the completion report, for the input/output request to the second logical device, to the host computer.

This technology is disclosed in Japanese Patent Application Laid-Open No. 2004-220450, for example.

SUMMARY OF THE INVENTION

In the above mentioned storage control method, if a data write request is issued from the host device to the second logical device of the second storage system, for example, this data is written to the first logical device of the first storage system, which corresponds to the second logical device, by the second storage system. The second logical device is sometimes called a "virtual device", or a "virtual volume", for example, and the first logical device is sometimes called an "external device" or an "external volume", for example. Therefore this storage control method is called an "external connection" in this description for convenience.

An example of the storage control method used when storage systems are inter-connected is remote copy. A specific example of remote copy is as follows. That is, a host device is connected to a primary storage system, for example. The primary storage system is connected to a secondary storage system. A primary logical device of the primary storage system and a secondary logical device of the secondary storage system form a pair. When a write request, to write data to the primary logical device, is received, the primary storage system writes the data to the primary logical device, and synchronously or asynchronously transfers the data to the secondary logical device which forms a pair with the primary logical device. The secondary storage system receives the data transferred from the primary storage system, and writes the data to the secondary logical device.

The external connection and the remote copy share the aspect that storage control is performed by a plurality of storage systems which are communicably inter-connected.

An aspect of the present invention is to provide new storage control technology which uses the common aspect of external connection and remote copy.

The other objects of the present invention shall be clarified in the later description.

In the storage control method according to the first aspect of the present invention, each of three or more storage systems comprise a virtual volume, which is a virtual logical volume, and/or a real volume, which is a real logical volume as at least one logical volume. The virtual volume in a storage system and an external volume which is the real volume in another storage system are corresponded. A volume pair of a logical volume in a storage system as a copy source and a logical volume in another storage system as a copy destination is formed. At least one path is selected from a plurality of paths where one of the three or more storage systems is a start point storage system, and another one thereof is an end point storage system (in at least one path of the plurality of paths, there is a path where one or more other storage systems are used as relay point storage systems). The start point storage system receives a write request, including the specifications of a logical volume in the start point storage system and the write target data. According to the selected path, the write target data in the write request received by the start point storage system is written at least to a logical volume in the end point storage system by executing an external connection processing for writing the write target data to the external volume which corresponds to the virtual volume and/or a remote copy processing for writing the write target data to be written in a copy source volume to a copy destination, at least once.

According to an embodiment, it is preferable that the connection status of at least the selected path, out of the plurality of paths, is recognized, and the selected path is switched to another path according to the recognized connection status.

According to an embodiment, it is preferable that the load of each of the plurality of paths is recognized, and the selected path is switched to another path according to each of the recognized loads.

According to another embodiment, it is preferable that whether the write target data is data for which the remote copy processing has completed or not is managed, the connection status of at least the selected path of the plurality of paths is recognized, the load of each of the plurality of paths is recognized, and the selected path is switched to another path according to the recognized connection status and/or each load. And it is preferred that after switching the path, the remote copy processing is performed again for the write target data for which the remote copy processing has completed if the path is switched according to the connection status, and the remote copy processing is performed for the remote copy processing on the write target data for which the remote copy processing has not completed if the path is switched according to each of the loads.

According to an embodiment, it is preferable that each storage system stores the connection destination information. The connection destination information preferably includes the ID of a connection destination storage system which is a transmission destination of the write target data, and a connection type which indicates which one of the external connection processing and the remote copy processing is used to transmit the write target data to the connection destination storage system. In this case, it is preferable that the plurality of paths, including a plurality of path elements with regard to the connection correspondence of storage systems and connection type thereof, are constructed based on the connection destination information of each storage system.

According to an embodiment, it is preferable that the external connection processing and the remote copy processing are performed using two or more paths, including the selected path out of the plurality of paths, and in these two or more paths, both of a synchronous remote copy, which executes the remote copy processing synchronously with the processing of the write request to the copy source volume, and an asynchronous remote copy, which executes the remote copy processing asynchronously with the processing of the write request to the copy source volume, are executed.

The above mentioned storage control method can be implemented by hardware, a computer program or a combination thereof. The computer program is read and executed by a predetermined processor. In the information processing where the computer program is read and executed by the processor, a storage area existing on hardware resources, such as memory, may be used.

According to the present invention, new storage control technology, using a common aspect of the external connection and the remote copy, is provided.

BRIEF DESCRIPTION OF THE DRAWINGS

FIG. 3 is a functional block diagram depicting the storage control system according to an embodiment of the present invention;

FIG. 4A shows a configuration example of the volume list 63D;

FIG. 4B shows a configuration example of the connection storage management table 63A;

FIG. 4C shows a configuration example of the connection storage management table 63B;

FIG. 4D shows a configuration example of the connection storage management table 63C;

FIG. 4E shows a configuration example of the connection storage management table 63D;

FIG. 4F shows a configuration example of the external volume management table 64A;

FIG. 5A shows a configuration example of the external volume management table 64B;

FIG. 5B shows a configuration example of the path management table 67A;

FIG. 5C shows a configuration example of the connection status management table 65A;

FIG. 5D shows a configuration example of the copy volume management table 66C;

FIG. 6A shows a configuration example of the copy volume management table 66A;

FIG. 6B shows a configuration example of the write request and remote copy request;

FIG. 6C shows a configuration example of the remote copy creation request message;

FIG. 6D shows a configuration example of the remote copy environment setting request message;

DESCRIPTION OF THE PREFERRED EMBODIMENTS

Figure 1:
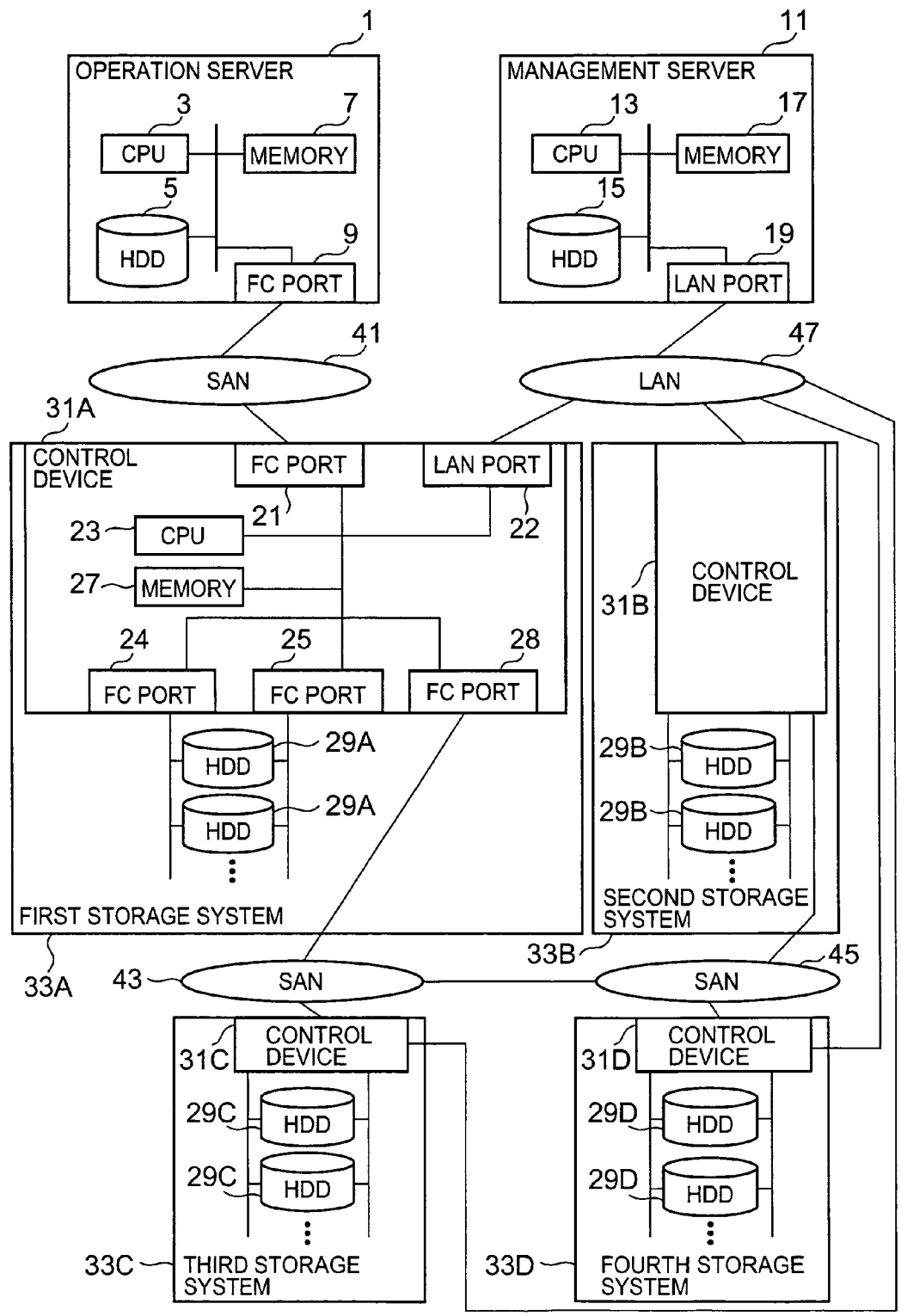
FIG. 1 is a diagram depicting an outline of the hardware configuration of the storage control system according to an embodiment of the present invention.

FIG. 1 shows an overview of the hardware configuration of the storage control system according to an embodiment of the present invention.

The management server 11 and the first-fourth storage systems 33A-33D are connected to the first communication network, such as a LAN (Local Area Network) 47. The operation server 1 and the first storage system 33A are connected to the second communication network, such as the first SAN (Storage Area Network). The first storage system 33A and the third storage system 33C are connected to the third communication network, such as the second SAN 43. The second storage system 33B and the fourth storage system 33D are connected to the fourth communication network, such as the fourth SAN 45 connected to the second SAN 43. Two or more communication networks, out of the first-fourth communication networks, may be one same communication network. Specifically the second SAN 43 and the third SAN 45, for example, may be a common SAN.

The management server 11 is a computer machine comprising a storage resource (e.g. memory 17, hard disk drive (HDD) 15), which can store various computer programs, a CPU 13 which reads and executes computer programs from the storage resource, and a hardware resource, such as LAN port 19 connected to LAN 47.

The operation server 1 as well is a computer machine comprising a storage source (e.g. memory 7, HDD 5) which can store various computer programs, a CPU 3 which reads and executes computer programs from the storage resource, and a hardware resource, such as a fiber channel port (FC port) 9 connected to SAN 41.

The first to fourth storage systems 33A-33D can have the same hardware configuration, even if the functions thereof are different. To simplify description, it is assumed that the hardware configurations of the first-fourth storage systems 33A-33D are substantially the same. Therefore the first storage system 33A will be described as a representative example. In the first-fourth storage systems 33A-33D in FIG. 1, a same type of composing element is identified by a combination of a same primary number and a different secondary code. To describe a same type of composing element without individual identification, only the primary number will be used.

The first storage system 33A comprises a control device 31A and a plurality of HDDs 29A, 29A, . . . The control device 33A is a device for controlling the operation of the first storage system 33A. The control device 33A comprises, for example, an FC port 21 connected to the first SAN 41, a LAN port 22 connected to the LAN 47, FC ports 24 and 25 connected to each HDD 29A, an FC port 28 connected to the second SAN 43, a CPU 25 and a memory 27. The memory 27 has a control area where the control information (e.g. later mentioned connection storage management table), which is required for controlling the processing executed by the first storage system 33A, and a cache area for temporarily storing data to be exchanged between the operation server 1 and the HDD 29A, are stored.

The above is the description on the hardware configuration of the storage control system according to the present embodiment. Now an overview of the present embodiment will be described.

Figure 2:
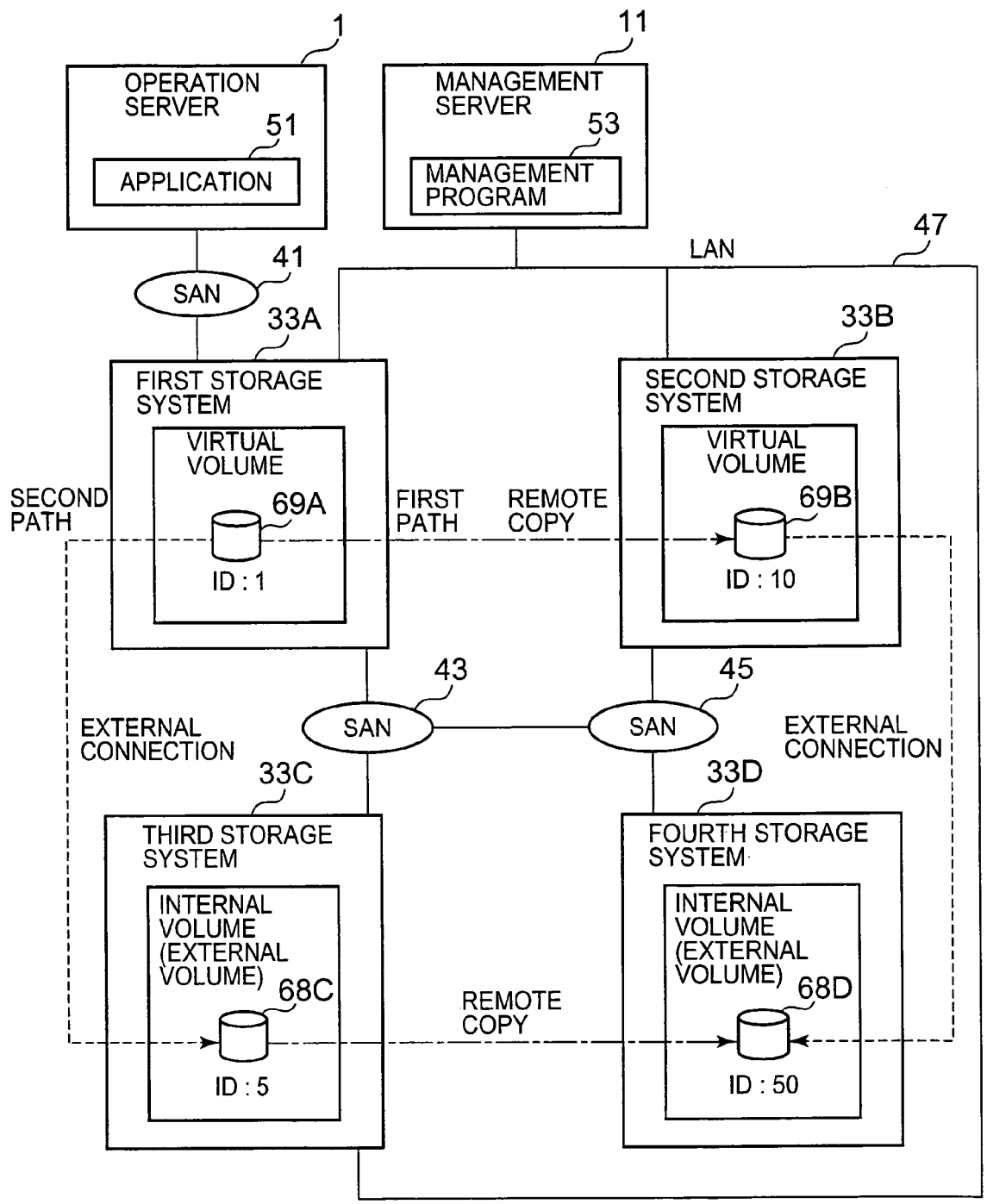
FIG. 2 is a diagram depicting an overview of an embodiment of the present invention.

FIG. 2 is a diagram depicting an overview of an embodiment of the present invention.

The operation server 1 has various computer programs, such as application program 51, and an operating system (OS), which is not illustrated. In the operation server 1, by the application program 51 issuing an I/O request (input/output request) to the OS, for example, processing for issuing an I/O request (input/output request, which is a data write request or a data read request), in which the access destination is specified, from the OS to the first storage system 33A, is performed. The operation server 1 can specify the later mentioned virtual volume 69A as the access destination. In other words, in this embodiment the storage system, which can receive an I/O request from the operation server 1, is the first storage system 33A.

In the first-fourth storage systems 33A-33D, a plurality of logical volumes are prepared. The types of logical volumes are, for example, a real volume 68 which is a real logical volume installed on a physical storage resource, such as HDD 29, and a virtual volume 69 which is a virtual logical volume which is not necessarily installed on a physical storage resource. In the description below, a real volume is called an "internal volume" if it exists in its own storage system, and an "external volume" if it exists in another storage system which is not its own.

Out of the first-fourth storage systems 33A-33D, at least the first and second storage systems 33A and 33B must have an external connection function. The external connection function is a function to provide the storage resource (typically an external volume) of another storage system as the storage resource (typically a virtual volume) of the storage system itself. Therefore if a write request to a virtual volume is issued, the write request is issued to the external volume corresponded to this virtual volume, and as a result, the data in the write request to the virtual volume is written to the external volume.

And out of the first-fourth storage systems 33A-33D, at least the first, third and fourth storage systems 33A, 33C and 33D must have a remote copy function. The remote copy function is a function to transfer data, to be written to the storage resource of the storage system itself (typically a primary logical volume), to another storage system so that the data is written to the storage resource (typically a secondary logical volume) of another storage system corresponded to the above storage resource.

In this embodiment, the first storage system 33A, which accepts the I/O request from the operation server 1, can access the internal volume 68D of the fourth storage system 33D indirectly, that is, via another storage system 33B or 33C. And in this embodiment, two types of paths can be provided as a path from the first storage system 33A to the internal volume 68D of the fourth storage system 33D: the first path via the second storage system, and the second path via the third storage system 33C. Also in the present embodiment, an optimum path, of which the data transfer speed is expected to be faster, can be automatically selected from the two types of paths, according to the status of each path, and access from the first storage system 33A to the internal volume 68D of the fourth storage system 33D can be performed via the selected path. This will be described more specifically.

In the present embodiment, it is assumed that the virtual volume 69A having the volume ID "1" is provided in the first storage system 33A, the virtual volume 69B having the volume ID "10" is provided in the second storage system 33B, the internal volume 68C having the volume ID "5" is provided in the third storage system 33C, and the internal volume 68D having the volume ID "50" is provided in the fourth storage system 33D. And it is assumed that the virtual volume 69B and the internal volume 68C are corresponded to the virtual volume 69A, and the virtual volume 69A and the internal volume 68D are corresponded to the virtual volume 69B, and the internal volume 68C and the internal volume 68D are corresponded to each other.

Here if the first storage system 33A receives the write request and the write target data specifying the virtual volume 69A from the operation server 1, for example, then processing according to one of the first path or second path, whichever is selected, is performed. (This selection may be performed at a timing when the first storage system 33A receives the write timing, for example, or may be at another timing.) This will be described more specifically below.

(1) When the First Path is Selected

The first storage system 33A (control device 31A to be more accurate) specifies the virtual volume 69B which is corresponded to the virtual volume 69A, and sends the remote copy request, for writing the received write target data to the virtual volume 69B, to the second storage system 33B. The second storage system 33B receives the remote copy request and the write target data, specifies the external volume (internal volume for the fourth storage system 33D) 68D which corresponds to the virtual volume 69B specified by the remote copy request, generates the write request specifying the external volume 68D, and sends the write request and the write target data to the fourth storage system 68D. The fourth storage system 33D receives the write request and the write target data, and writes the received write target data to the internal volume 68D specified by the received write request. By the above processing, the write target data, sent from the operation server 1, is written to the internal volume 68D. The fourth storage system 68D may issue the remote copy request and the write target data written in the internal volume 68D to the third storage system 33C, for example. In this case, the write target data sent from the operation server 1 is also written to the internal volume 68C.

(2) When the Second Path is Selected

The first storage system 33A specifies the external volume 68C corresponded to the virtual volume 69A, generates a write request specifying the external volume 68C, and sends the write request and the write target data to the third storage system 68C. The third storage system 33C receives the write request and the write target data, and writes the received write target data to the internal volume 68C specified by the received write request. The third storage system 33C specifies the internal volume 68D which is corresponded to the internal volume 68C, and sends the remote copy request, for writing the received write target data to the internal volume 68D, to the fourth storage system 33D. By the above processing, the write target data sent from the operation server 1 is written to both the internal volumes 68C and 68D.

As described above, the processing performed by this storage control system differs depending on which path, the first path or second path, is selected. And the selection of the first path or second path can be performed by the CPU 13 reading the management program 11 installed in the management server 11, and executing that program.

Now the present embodiment will be described in more detail.

FIG. 3 is a functional block diagram of the storage control system according to an embodiment of the present invention.

Since the first storage system 33A and the second storage system 33B are substantially the same, the first storage system 33A will be described as a representative example. The memory 27 of the control device 31A can store, for example, the control program 61A, the connection storage management table 62A, the volume list 63A, the external volume management table 64A, the connection status management table 65A, the copy volume management table 66A and the path management table 67A. The control program 61A is a program for controlling the operation of the control device 31A, and is read and executed by the CPU 23.

Since the third storage system 33C and the fourth storage system 33D are substantially the same, the third storage system 33C will be described as a representative example. The memory 27 of the control device 31C can store the control program 61C, the connection storage management table 62C, the volume list 63C, the connection status management table 65C and the copy volume management table 66C. The control program 61C is a program for controlling the operation of the control device 31C, and is read and executed by the CPU 23.

The above mentioned tables 62 to 67 are electronic tables, and the content thereof may be common for all the storage systems 33A to 33D, or may be unique to each storage system 33. A specific configuration example of each table 62 to 67 will now be described.

FIG. 4A shows a configuration example of the volume list 63D.

The volume list 63 will be described using the volume list 63D as a representative example. The volume list 63D is a table for managing the logical volumes 68 and 69 existing in the fourth storage system 33D and which has the volume list 63D. In the volume list 63D, the ID of the logical volume, the type of the logical volume (e.g. internal or virtual), and the storage capacity of the logical volume, for example, are recorded for each logical volume.

FIG. 4B shows a configuration example of the connection storage management table 63A. FIG. 4C shows a configuration example of the connection storage management table 63B. FIG. 4D shows a configuration example of the connection storage management table 63C. FIG. 4E shows a configuration example of the connection storage management table 63D.

The connection storage management table 63 is a table for managing the storage systems to which the storage system 33 having this connection storage management table 63 is connected and the connection format thereof. In the connection storage management table 63, the ID of the connection destination storage system and the connection type, for example, are recorded. The connection type is, for example, "external", which means that the storage control is performed for the connection destination according to the external connection, and "remote", which means that the storage control is performed for the connection destination according to the remote copy.

According to FIG. 4B, the first storage system 33A can perform storage control according to the external connection to the third storage system 33C to which ID "600" is assigned according to the external connection, and can perform storage control according to the remote copy to the second storage system 33B to which ID "15000" is assigned. According to FIG. 4C, the second storage system 33C can perform storage control to the fourth storage system 33D to which ID "650" is assigned according to the external connection, and can perform storage control according to the remote copy to the first storage system 33A to which ID "10000" is assigned. According to FIG. 4D, the third storage system 33C can perform storage control according to the remote copy to the fourth storage system 33D to which ID "650" is assigned. According to FIG. 4E, the fourth storage system 33D can perform storage control according to the remote copy to the third storage system 33C to which ID "600" is assigned.

FIG. 4F shows a configuration example of the external volume management table 64A. FIG. 5A shows a configuration example of the external volume management table 64B.

The external volume management table 64 is a table for managing the external connection, and specifically it is a table for managing an external volume in the storage system 33 to which a logical volume in the storage system 33 having this external volume management table 64 is corresponded. In the external volume management table 64, the ID of the logical volume in the storage system 33 having this external volume management table 64, the ID of another storage system 33 which is the connection destination of this storage system 33, and the ID of the external volume are registered.

According to FIG. 4F, the virtual volume 69A with ID "1" corresponds to the external volume 68C to which ID "10" is assigned in the third storage system 33C. According to FIG. 5A, the virtual volume 69B with ID "5" corresponds to the external volume 68D, to which ID "50" is assigned, in the fourth storage system 33C.

FIG. 5B is a configuration example of the path management table 67A.

The path management table 67 will now be described using the path management table 67A as a representative example. The path management table 67A is a table for managing a plurality of paths related to the first storage system 33A having this path management table 67A. In this embodiment, the number of paths to which the first storage system 33A is related is two, so the path management data for managing each of the two paths exist in the path management table 67A. Each path management data includes, for example, a path ID, system ID of the system 1, type between 1 and 2, system ID of system 2, type between 2 and 3, and system ID of system 3. System 1 is a storage system to be a start point of the path (first storage system 33A in this case). System 3 is a storage system to be an end point of the path (fourth storage system 33D in this case). System 2 is a storage system to be a relay point between system 1 and system 3 (the second or third storage system 33B or 33C in this case). The type between 1 and 2 is a connection type of system 1 to system 2 (e.g. external or remote), and specifically indicates the kind of storage control performed from system 1 to system 2. The type between 2 and 3 is a connection type of the system 2 to system 3.

FIG. 5C shows a configuration example of the connection status management table 65A.

The connection status management table 65 will now be described using the connection status management table 65A as a representative example. The connection status management table 65A is information to indicate the connection status (e.g. normal or abnormal) for each connection destination storage system. According to FIG. 5C, the first storage system 33A is connected to both the second and third storage systems 33B and 33C normally. In this status, if the first storage system 33A detected that access to the third storage system 33B is disabled, for example, the status corresponding to the connection destination storage system ID "600" can be updated from "normal" to "abnormal".

FIG. 5D shows a configuration example of the copy volume management table 66C.

Since the copy volume management tables 66C and 66D in the third and fourth storage systems 33C and 33D can have the same configuration, the copy volume management table 66C will be described as a representative example. The copy volume management table 66C is a table for managing a logical volume in a storage system which forms a pair with a logical volume in the third storage system 33C having this copy volume management table 66C. For example, in the copy volume management table 66C, the ID of a copy source storage system (third storage system 33C in this case), the ID of a logical volume of the copy source (e.g. internal volume 68C), the ID of a copy destination storage system (fourth storage system 33D in this case), the ID of a logical volume of the copy destination (e.g. internal volume 68D), and the copy type/timing are recorded. The copy type/timing indicates the type of copy (e.g. remote copying or internal copy, which is copy between volumes in a same storage system), and the timing of copy (e.g. synchronous or asynchronous).

If the timing of copy is "synchronous" and the type of copy is remote copy (in other words in the case of synchronous remote copy), the storage system 33C sends the remote copy request of the write target data to the fourth storage system 33D at a timing substantially the same as the write processing execution timing (such as a timing when the write target data is stored in the cache area, or a timing when the write target data is written to the internal volume 68C) according to the write request, when the write request to the internal volume 68C is received, for example. And the storage system 33C returns write completion to the write request source (e.g. storage system 33A) when a predetermined response is received from the fourth storage system 33D.

If the timing of copy is "asynchronous", for example, and the type of copy is remote copy (in other words in the case of asynchronous remote copy), the storage system 33C sends the remote copy request for the write target data to the fourth storage system 33D at a timing which is different from the write processing execution timing, according to the write request to the internal volume 68C. When the write request is received, the storage system 33C can return the write completion report to the write request source (e.g. storage system 33A). In the case of asynchronous remote copy, the storage system 33C can store the uncopied write target data in the side file, which is a predetermined storage area provided in the memory 27, for example, and send the uncopied write target data stored in the side file to the fourth storage system 33D at a predetermined timing (in other words, uncopied data need not be read from the internal volume 68C).

FIG. 6A shows a configuration example of the copy volume management table 66A.

Since the copy volume management tables 66A and 66B in the first and second storage systems 33A and 33B at the operation server 1 side can have the same configuration, the copy volume management table 66A will be described as a representative example. In the copy volume management table 66A, the type of remote copy to be performed in each path related to the virtual volume is recorded for each virtual volume. For example, according to FIG. 6A, in the case of the virtual volume 69A with ID "1", asynchronous remote copy is performed from the internal volume 68C (ID "10") in the third storage system (ID "600") to the internal volume 68D (ID "50") in the fourth storage system (ID "650") in the second path of which the path ID is "2".

FIG. 6B shows a configuration example of the write request and the remote copy request.

In other words, the write request and the remote copy request includes, for example, the ID of the storage system to be the request destination, the ID of the logical volume and the write target data.

Specifically the operation server 1 can issue a write request which includes the ID of the first storage system 33A, the ID of the virtual volume 69A and the write target data A to the first storage system 33A, for example. In this case, the first storage system 33A can specify that the external volume 68C corresponding to the virtual volume 69A exists based on the external volume management table 64A, generate a write request which includes the ID of the third storage system 33C, the ID of the external volume 68C and the write target data A, and issue the write request to the third storage system 33C. Also the first storage system 33A can specify the volume 69B, which forms a volume pair with the virtual volume 69A based on the copy volume table 66A, generate a remote copy request which includes the ID of the second storage system 33B, the ID of the virtual volume 69B and the write target data A, and issue the remote copy request to the second storage system 33B.

FIG. 6C shows a configuration example of the remote copy creation request message. FIG. 6D shows a configuration example of the remote copy environment setting request message. These configuration examples will be described later.

In the storage control system according to the present embodiment, various processings are performed, and these processings generally be classified into remote copy volume creation processing and remote copy execution processing. In the volume pair creation processing, processing for providing the administrator with the information necessary for creating the remote copy volume (copy destination volume to form a pair with the copy source volume) and processing for creating the remote copy requested from the administrator, for example, are performed. In the remote copy execution processing, processing for presenting an alternate path to the administrator when necessary in remote copy, processing for changing the path for remote copy according to the request of the administrator and data transfer between the volume pair, for example, are performed.

Now the remote copy volume creation processing and the remote copy execution processing will be described.

First the general flow of the remote copy volume creation processing will be described. The program for implementing this processing may be either the management program 53 or the control programs 61A-61D. In the description below, it is assumed that the management program 53 is used.

(1) The administrator, who is an operator of the management server 11, selects the volume pair for remote copy (that is, the copy source volume and the copy destination volume) on the management server 11. In this case, if the volume selected by the administrator is a virtual volume, the management server 11 shows the external volume corresponding to the virtual volume to the administrator. If the volume selected by the administrator is an external volume, the management server 11 shows the virtual volume, corresponding to the external volume, to the administrator.

(2) The administrator determines the copy source volume and the copy destination volume, and issues the remote copy creation request for creating the remote copy volume to the management server.

(3) When the remote copy creation request is accepted, the management server 11 searches a path on which the remote copy volume can be created, including a path via the external storage system (connection destination storage system of which the connection type is "external"), and displays it on the display screen of the management server 11 (to show it to the administrator).

(4) The management server 11 also checks whether the load status and the connection status (e.g. normal or abnormal) of each storage system 33A-33D, and displays the optimum path on the display screen.

(5) When the path for remote copy is determined and the copy destination volume, which is a copy of the copy source volume, is actually created, if the creation is via the external storage system, then the management server 11 instructs the external storage system to set an environment for remote copy, and requests the external storage system to create the remote copy.

(1) is necessary for the following reasons. That is, the virtual volume 69 can be handled in the same way as the internal volume 68. Therefore the administrator normally is not concerned whether the volume is a virtual volume or not and which external volume the volume corresponds to. However when a remote copy volume is created, the administrator must recognize the storage systems between which the remote copy volume will be created. That is, why the virtual volume and the corresponding external volume are presented as described in (1).

When the administrator selects an external volume as the copy destination volume, the corresponding virtual volume is presented, and this is because the copy destination volume can be accessed from the storage systems 33A and 33B (e.g. new type of storage system) at the operation server side.

In the remote copy volume creation processing, the volume correspondence relationship retrieval processing (see FIG. 7), the path search processing (see FIG. 8), the path determination processing (see FIG. 9) and the copy volume creation execution processing (see FIG. 10), for example, are performed. Each processing will now be described in detail.

Figure 7:
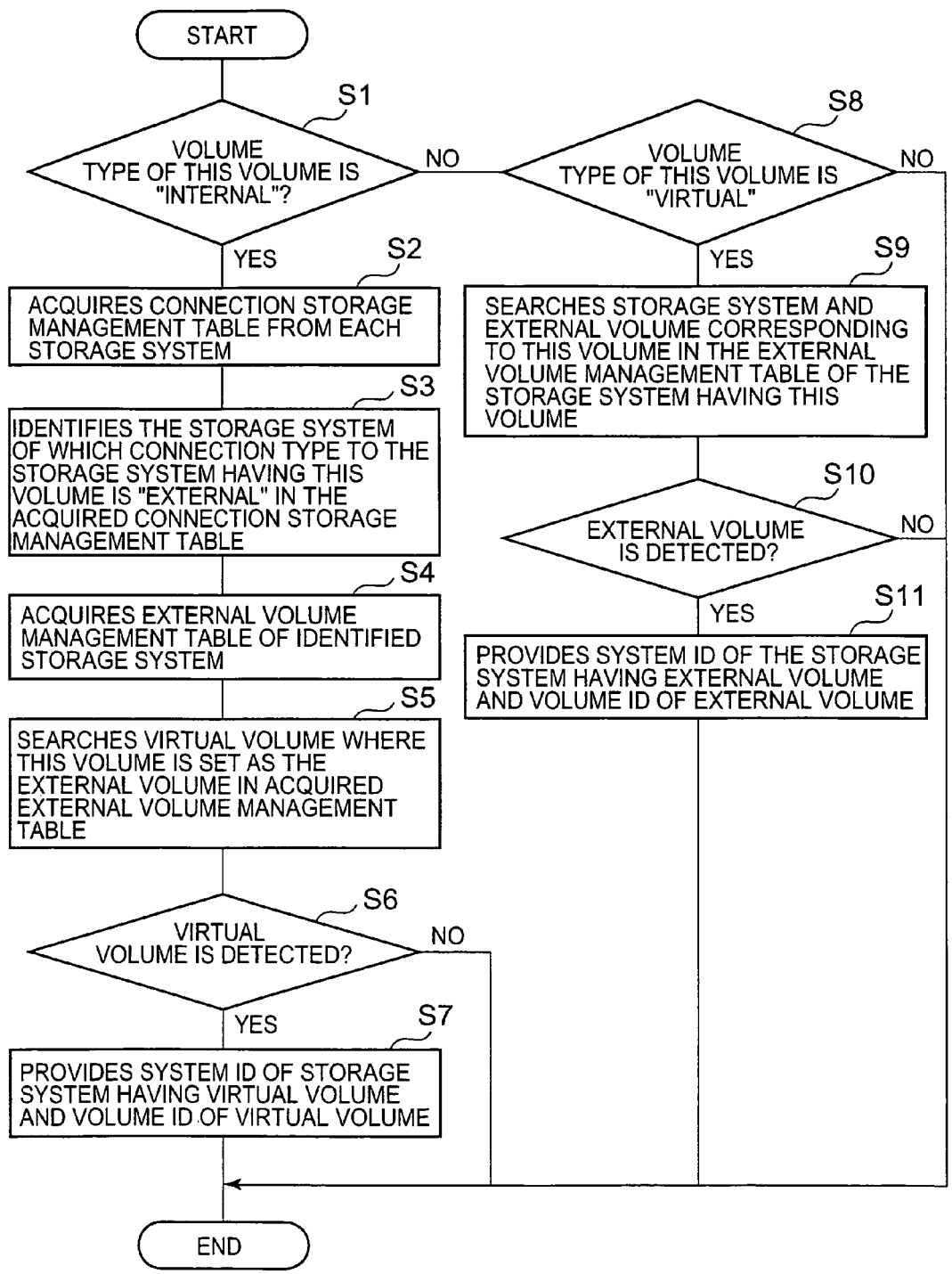
FIG. 7 is a flow chart depicting an example of the volume correspondence relationship retrieval processing.

FIG. 7 shows an example of the flow of the volume correspondence relationship retrieval processing. The processing shown in FIG. 7 is implemented in the management server 11 by the CPU 13 executing the management program 53.

The CPU, which executes the management program 53 (hereafter called the "management CPU" for convenience) 13, identifies whether the volume type of this volume is "internal" or not (step S1). Specifically the management CPU 13 can acquire the volume lists 63A-63D via the LAN 47 by issuing a predetermined instruction to the control programs 61A-61D in each storage system 33A-33D. The management CPU 13 can display a GUI (Graphical User Interface), with which a plurality of logical volumes in each storage system 33A-33D can be selected, on the display screen of the management server 11, for example, based on the acquired volume lists 63A-63D. When a selection of a logical volume on the GUI is received, the management CPU 13 can identify the volume type corresponding to the ID of the selected logical volume from the volume lists 63A-63D.

The case when S1 is YES will be described. In this description, it is assumed that this volume is the internal volume 68C to simplify description. The management CPU 13 acquires the connection storage management tables 62A-62D from each storage system 33A-33D (S2). And the management CPU 13 refers to the acquired connection storage management tables 62A-62D, and identifies the storage system 33A on which the connection type for the storage system 33C having this volume 68C is the "external connection" (S3). Then the management CPU 13 acquires the external volume management table 64A from the identified storage system 33A (S4). The management CPU 13 searches the virtual volume in which this volume 68C is set as the external volume from the acquired external volume management table 64A (S5). If a virtual volume 69A is specified (YES in S6), the management CPU 13 can specify a storage system ID of the storage system 33A corresponding to the volume ID of the specified virtual volume 69A from the volume list 63A, and provide (e.g. display) the specified volume ID and the storage system ID (S7).

The case when S1 is NO will be described. In this description, it is assumed that this volume is a virtual volume 69A to simplify description. The management CPU 13 identifies whether the volume type of this volume is "virtual" or not (S8). If it is identified as "virtual" (YES in S8), the management CPU 13 acquires the external volume management table 64A from the storage system 33A having this volume 69A, and searches the storage system and the external volume corresponding to this volume 69A from the external volume management table 64A (S9). As a result, if the external volume 68C is detected (YES in S10), the management CPU 13 provides (e.g. displays) the volume ID of the external volume 68C and the storage system ID of the storage system 33C having this external volume 68C (S11).

Figure 8:
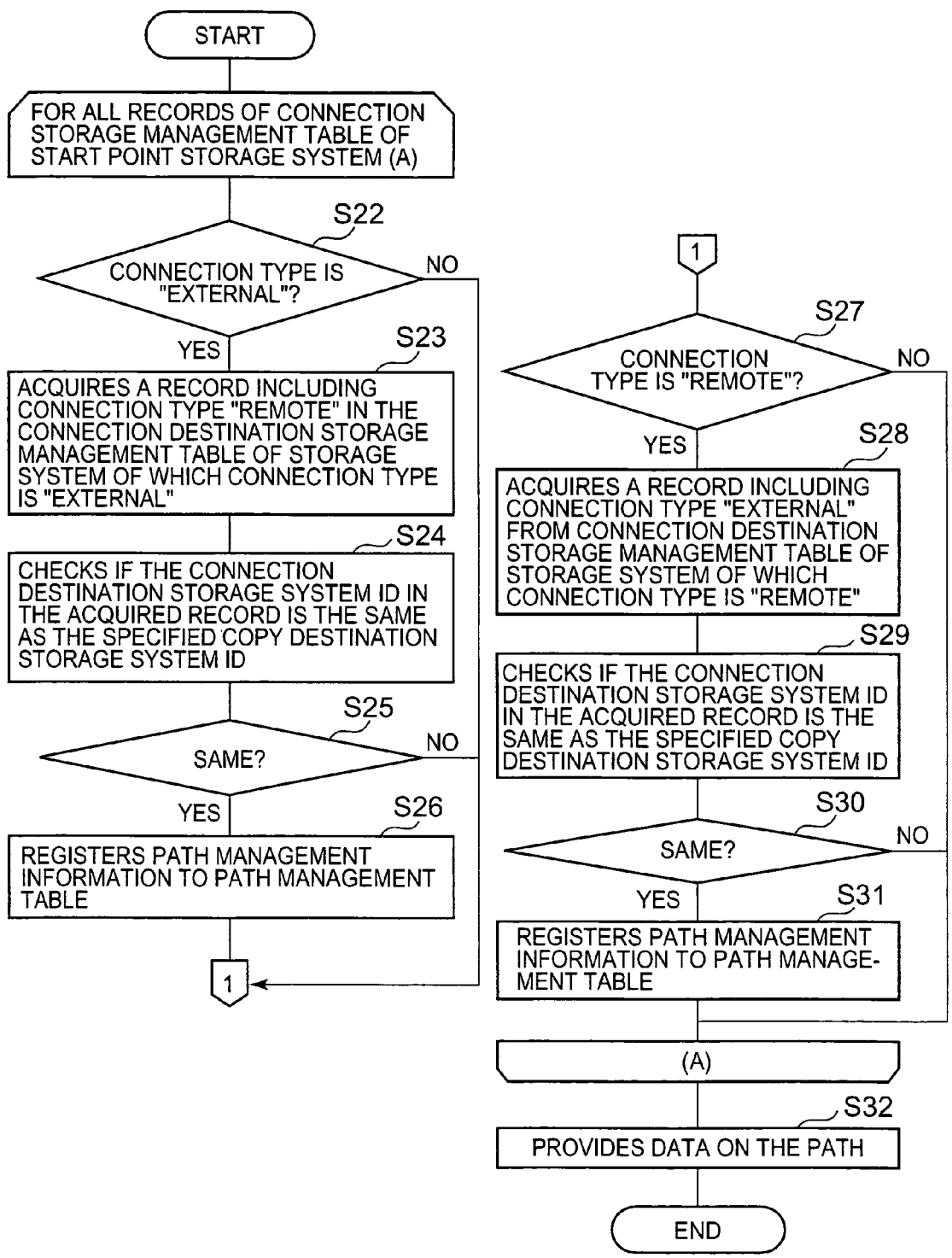
FIG. 8 is a flow chart depicting an example of the path search processing.

FIG. 8 shows an example of the flow of the path search processing. The processing shown in FIG. 8 can also be executed by the management CPU 13.

The management CPU 13 can start the processing in FIG. 8 by receiving the input of the remote copy creation request message shown in FIG. 6C from the administrator, for example. The remote copy creation request message is a request for setting the volume pair. The remote copy creation request message includes the copy source system ID, the copy source volume ID, the copy destination system ID, the copy destination volume ID and the path ID, for example, as shown in FIG. 6C. Here it is assumed that the remote copy creation request message is for the storage system 33A, for example, and includes the copy source system ID "600", the copy source volume ID "10", the copy destination system ID "650" and the copy destination volume ID "50". In other words, it is assumed that the internal volume 68C of the third storage system 33C is specified as the copy source, and the internal volume 68D of the fourth storage system 33D is specified as the copy destination. This specification can be performed by the management CPU 13 displaying a plurality of volumes so that selection is possible, and accepting the selection of a volume based on the volume lists 63A to 63D. In the remote copy creation request message here, it is assumed that the path ID is null data, since a path has not yet been set.

The management CPU 13 performs the processing in S22 to S31 for all the records on the connection storage management table of the start point storage system. Here the "start point storage system" is a storage system which becomes the start point of the path. If the remote copy creation request message to the storage system 33A is received as above, for example, the management CPU 13 identifies the start point storage system as the first storage system 33A. Therefore the connection storage management table is identified as 62A (see FIG. 4B).

If the connection type is written as "external" in a record in the connection storage management table 62A (YES in S22), the management CPU 13 acquires a record which includes the connection type "remote" from the connection storage management table 62C of the third storage system 33C corresponding to the connection type (S23). And the management CPU 13 checks whether the connection destination storage system ID in the acquired record is the same as the specified copy destination storage system ID (S24). If the same (YES in S25), the management CPU 13 registers the path management data in the path management table 67A provided in the storage resource of the management server 11 (S26). The path management data registered here becomes the record on the second line in FIG. 5B. In other words, "2" is assigned as the path ID, and the system ID of system 1 is the ID of the first storage system 33A which is the start point storage system, and the system ID of system 2 is the ID of the third storage system 33C corresponding to the connection type "external", and the system ID of system 3 is the storage system ID corresponding to the connection type "remote" (that is, the ID of the fourth storage system 33D).

If "remote" is written as the connection type in a record in the connection storage management table 62A (NO in S22, YES in S27), the management CPU 13 acquires a record which includes the connection type "external" from the connection storage management table 62B of the second storage system 33B corresponding to the connection type (S28). And the management CPU 13 checks whether the connection destination storage system ID in the acquired record is the same as the copy destination storage system ID (S29). If the same (YES in S30), the management CPU 13 registers the path management data in the path management table 67A provided on the storage resource of the management server 11 (S31). The path management data registered here is the record on the first line in FIG. 5B. In other words, "1" is assigned as the path ID, and the system ID of system 1 is the ID of the first storage system 33A, which is the start point storage system, the system ID of system 2 is the ID of the second storage system 33B corresponding to the connection type "remote", and the system ID of system 3 is the storage system ID corresponding to the connection type "external" (that is, the ID of the fourth storage system 33D).

After S22 to S31 is performed for all the records in the connection storage management table 62A, the management CPU 13 provides the path management table 67A provided on the storage resource of the management server 11 (S32). For example, the management CPU 13 can display the path management table 67A or send it to the first storage system 33A.

Figure 9:
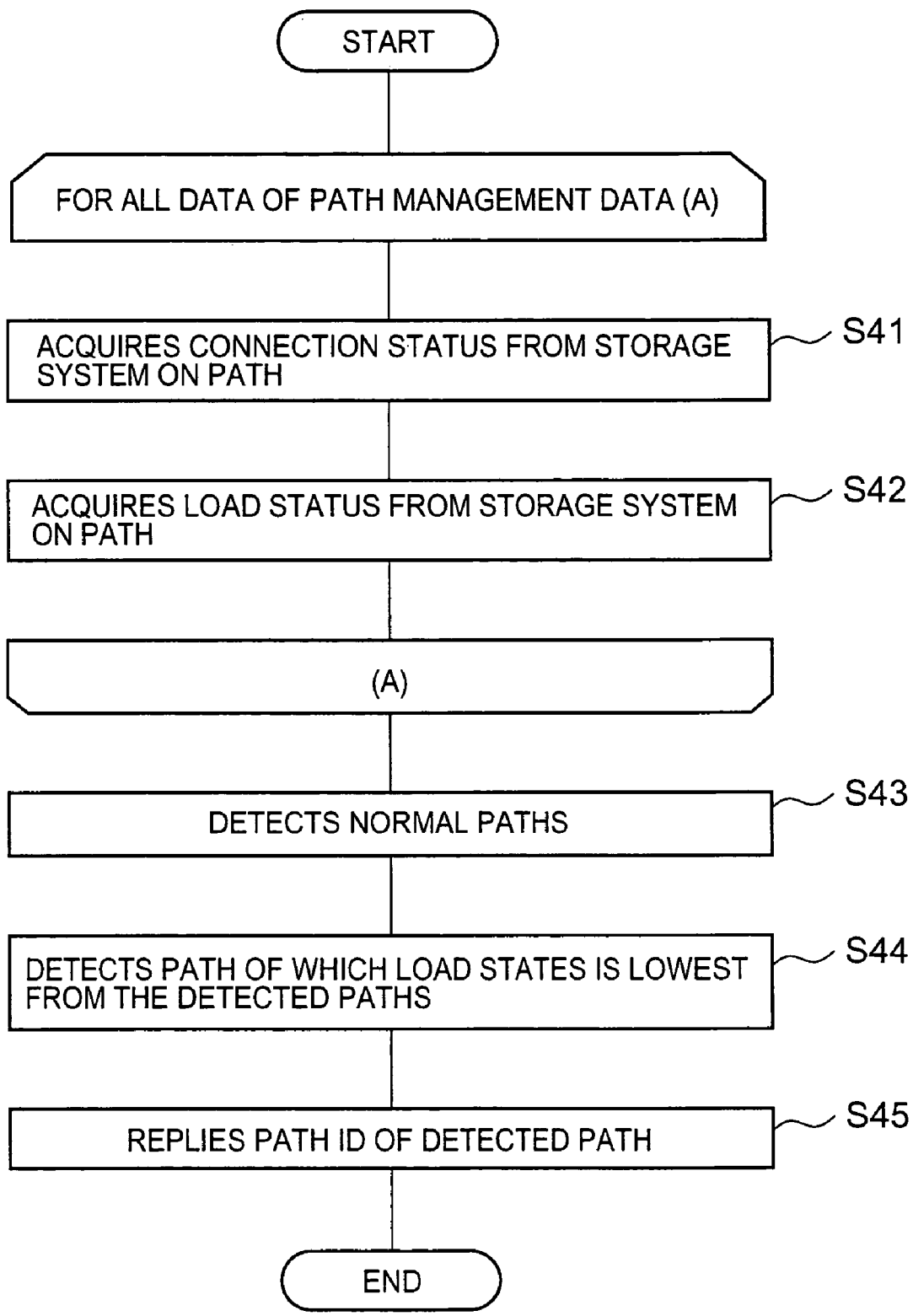
FIG. 9 is a flow chart depicting an example of the path determination processing.

FIG. 9 shows an example of the flow of the path determination processing. The processing shown in FIG. 9 can be performed when the default path is set, for example, but may be performed during remote copy execution. The processing shown in FIG. 9 as well can be executed by the management CPU 13 (or may be executed by the CPU 23 which reads and executes the control program 61A, for example). In the following description, it is assumed that the path management table to be used is 67A to easily understand the processing flow in FIG. 9.

The management CPU 13 performs processing S41 and S42 for all records in the path management table 67A, that is for all the paths defined in the path management table 67A. In other words, the management CPU 13 acquires the connection status (specifically the status recorded in the connection status management table 65 in the storage system 33) from each storage system (including the start point and end point) on the path indicated by one record in the path management table 67A (S41). The management CPU 13 also acquires the load status from each storage system on this path (S42). The connection status acquisition methods that can be use here are, for example, (A) acquiring via the LAN 47, (B) acquiring via the storage system (e.g. acquiring from the storage system 33D via the storage system 33C), or (C) acquiring from the fiber channel constituting SANs 43 and 45. The load status acquisition methods that can be used are the above method (A) or (B). The load status to be acquired is, for example, the use status of the computer resource in the storage system 33, specifically the use status of the CPU 23 and the use status of the memory 27 (particularly the above mentioned side file), for example. The use status is the activity ratio, for example.

After performing S41 and S42 for all the records in the path management table 67A, the management CPU 13 detects a path of which the connection status is "normal" (S43), and detects a path of which the load is lowest from the detected paths (S44). The management CPU 13 calculates the average value of the loads of a plurality of storage systems existing on the path for each path detected in S43, for example, and chooses one, of which the calculated average value is the lowest, as the path of which load is lowest.

The management CPU 13 provides the path ID of the path detected in S44 (S45). For example, the management CPU 13 displays the path ID or notifies it to the first storage system 33A having the path management table 67A.

Figure 10:
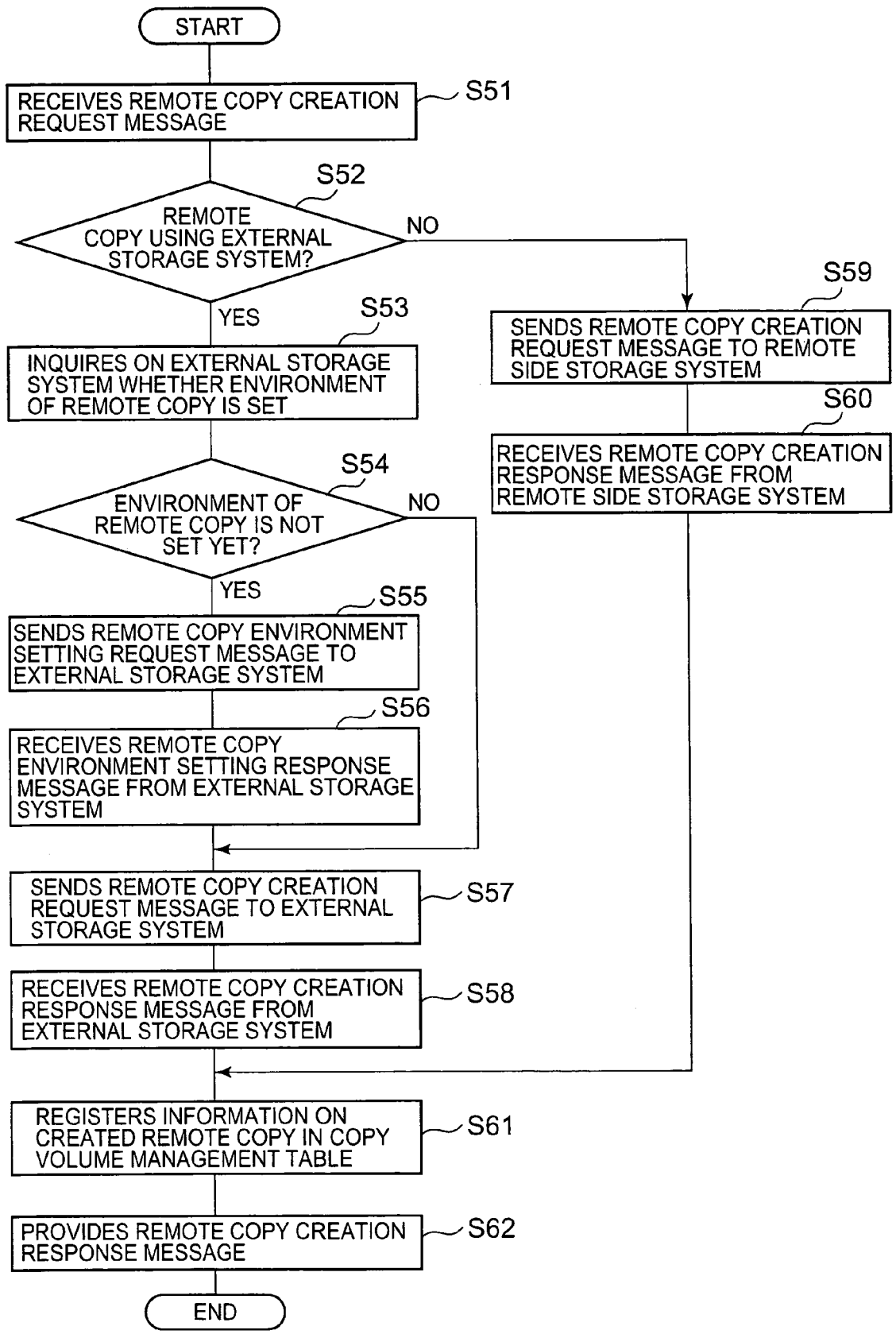
FIG. 10 is a flow chart depicting an example of the copy volume creation execution processing.

FIG. 10 shows an example of the flow of the copy volume creation execution processing. The processing shown in FIG. 10 can also be executed by the management CPU 13.

The management CPU 23 receives the remote copy creation request message (S51). Here the remote copy creation request message is for the storage system 33A, for example, and includes the copy source system ID "600", the copy source volume ID "10", the copy destination system ID "650", the copy destination volume ID "50" and the path ID "2".

The management CPU 13 retrieves the path management data having the path ID included in the remote copy creation request message from the path management table 67A, and judges whether the remote copy used an external storage system (connection destination of which the connection type is "external", such as the third storage system 33C) based on the retrieved path management data (S52). Specifically the management CPU 13 refers to the type between 1 and 2 in the retrieved path management data, and judges whether it is "external".

If the result of S52 is YES, the management CPU 13 inquires the external storage system 33C whether the environment of the remote copy is set (S53).

If the reply is not yet set (YES in S54), the management CPU 13 sends the remote copy environment setting request message to the external storage system 33C (S55). The remote copy environment setting request message is a request to set the environment for executing the remote copy. As FIG. 6D shows, the remote copy environment setting request message includes, for example, the port number of the local side storage system (e.g. the number of FC port of the external storage system 33C), the system ID of the remote side storage system (e.g. the fourth storage system 33D), and the port number of the remote side storage system (e.g. the number of the FC port of the fourth storage system 33D). The external storage system 33C sets the environment for the remote copy according to the remote copy environment setting request message (stores the information included in the remote copy environment setting request message, to be more specific), for example, and sends the remote copy environment setting response message to indicate completion of the environment setting to the management server 11. The management CPU 13 receives the remote copy environment setting response message (S56).

Then the management CPU 13 sends the remote copy creation request message to the external storage system 33C. The remote copy creation request message, which is sent here, can be the same message as the remote copy creation request message received in S51. The external storage system 33C receives the remote copy creation request message, and has the fourth storage system 33D prepare the internal volume 68D, which is exactly the same internal volume as the internal volume 68C having the copy source volume ID, and has the copy destination volume ID, for example, according to the remote copy creation request message. The external storage system 33C writes various information included in the remote copy creation request message to the copy volume management table 66C. The external storage system 33C transmits the remote copy creation response message to the management server 11. The management CPU 13 receives the remote copy creation response message (S58).

Then the management CPU 13 registers the information on the created remote copy in the copy volume management table 66A (S61). Specifically the management CPU 13 registers the various information included in the remote copy creation request message received in S51 and the virtual volume ID (volume ID registered in the external volume management table 64A), which matches the copy source volume ID in the message, in the copy volume management table 66A, for example. As the copy type, the type between 2 and 3, that is "remote", in the path management table 67A, for example, may be registered. As the copy timing, the default timing or the timing specified by the administrator, for example, may be registered.

After S61, the management CPU 13 provides the remote copy creation response message to the transmission source of the remote copy creation request message received in S51 (S62).

If the result of S52 is NO, on the other hand, the management CPU 13 sends the remote copy creation request message to the remote side storage system (second storage system 33B in this case) (S59). By this, the processing shown in FIG. 10 is performed in the remote side storage system 33B, and the management CPU 13 receives the remote copy creation response message from the remote side storage system 33B (S60). Then the management CPU 13 performs the above mentioned S61 and later processing.

The above is an example of the flow of the remote copy volume creation processing. Now the remote copy execution processing will be described. The path switching processing (see FIG. 11) and the remote copy processing (see FIG. 12), for example, are executed in the remote copy execution processing. Each processing will be described in detail.

Figure 11:
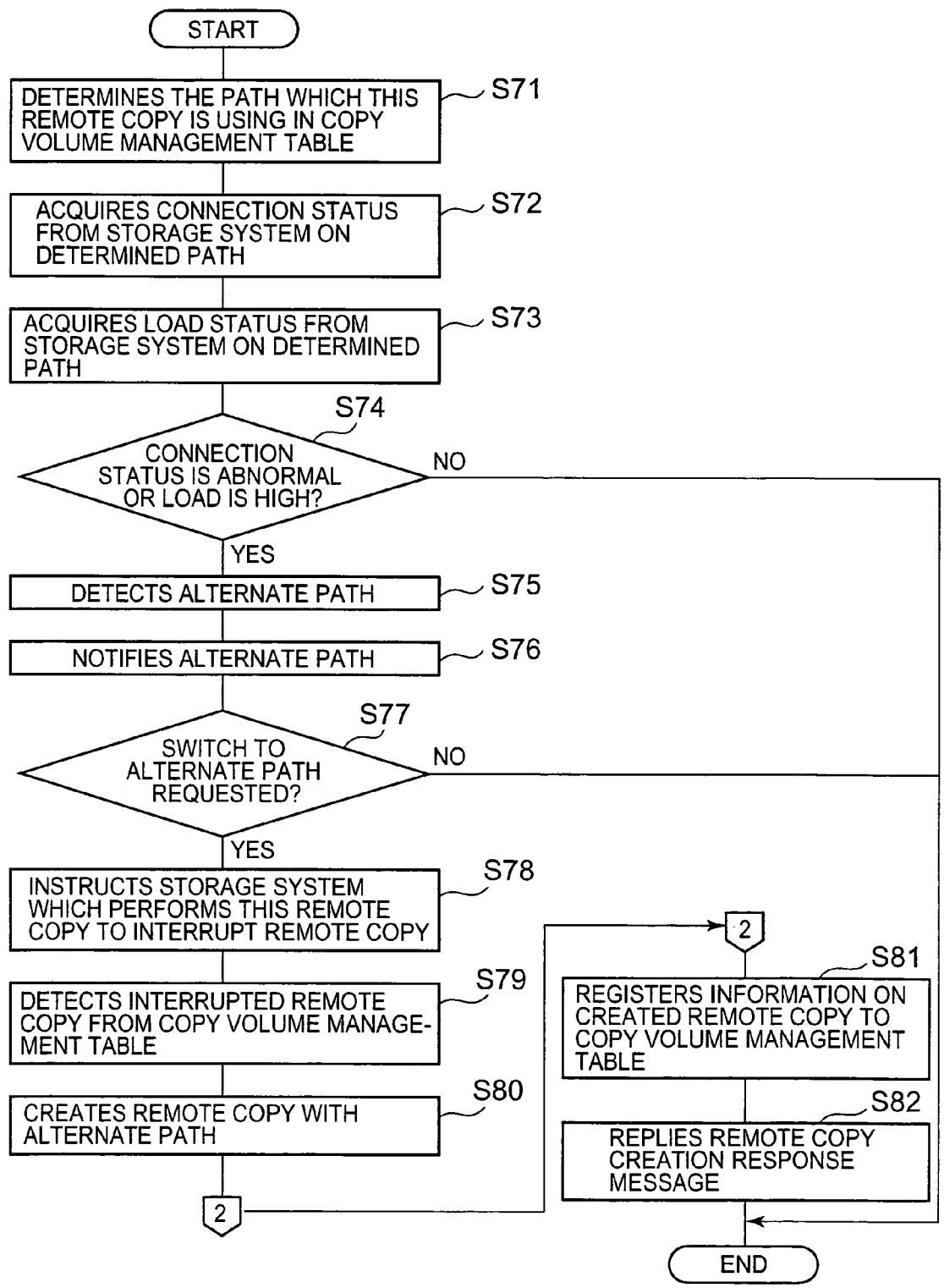
FIG. 11 is a flow chart depicting the path switching processing.

FIG. 11 shows an example of the flow of the path switching processing. The processing shown in FIG. 11 can be executed by the CPU, which reads and executes the control program 61A of the first storage system 33A when the storage control system according to the present embodiment is operating (e.g. when remote copy is in-execution) (hereafter called the control CPU) 23, or by the management CPU 13 of the management server 11, for example. In the following description, it is assumed that the control CPU 23 executes this processing.

The control CPU 23 determines the path (e.g. path ID "2") being used in this remote copy (e.g. remote copy related to the record on the first line, which is currently being referred to) from the copy volume management table 66A (S71).

Then the control CPU 23 acquires the connection status and the load status from the storage system (e.g. 33C and 33D) on the determined path (S72 and S73). The control CPU 23 judges whether the acquired connection status is "abnormal" or not, or whether the load thereof is high or not (S74). Whether the load is high or not is judged, for example, by whether the acquired memory use ratio is higher than a predetermined memory use ratio or not, or whether the acquired CPU use ratio is higher than a predetermined use ratio or not.

If the result of S74 is YES, the control CPU 23 detects an alternate path, and notifies the detected alternate path (e.g. path ID thereof) to the management server 11 (S76). The alternate path to be detected here is, in the path management table 66A, a path of which the system ID of system 1 (that is the system ID of the start point) and the system ID of system 3 (that is the system ID of the end point) are the same as the system ID of system 1 and the system ID of system 3 of the path determined in S71.

In the management server 11 which received the notice, it is judged whether the connection request for connection to the detected alternate path will be issued based on a predetermined calculation formula written in the management program 53, or based on the judgment of the administrator using the management server 11, for example. If it is determined to issue the request, the control CPU 23 receives the request to switch, to the alternate path, from the management server 11.

If the request to switch to the alternate path is received (YES in S77) after S76, the control CPU 23 instructs the storage system 33C performing this remote copy to interrupt the remote copy (S78). By this, the remote copy is interrupted.

The control CPU 23 deletes the record on the interrupted remote copy from the copy volume management table 66A (S79). Then the remote copy on the alternate path is created (S80) by executing the processings in FIG. 8 and FIG. 10, for example, and the information on the created remote copy is registered in the copy volume management table 66A (S81), and the remote copy creation response message is returned to the management server 11 (S82).

The above is the description of an example of the flow of the path switching processing. In this flow, if the result of S74 is YES, then S78 may be executed without executing S76 and S77 once the alternate path is detected. Also in the copy volume management table 66A, the information on the remote copy which uses the path may be registered in advance for each path by the processings in FIG. 8 and FIG. 10, so that remote copy using the alternate path can be started after S78 without executing S79 and later processing.

Figure 12:
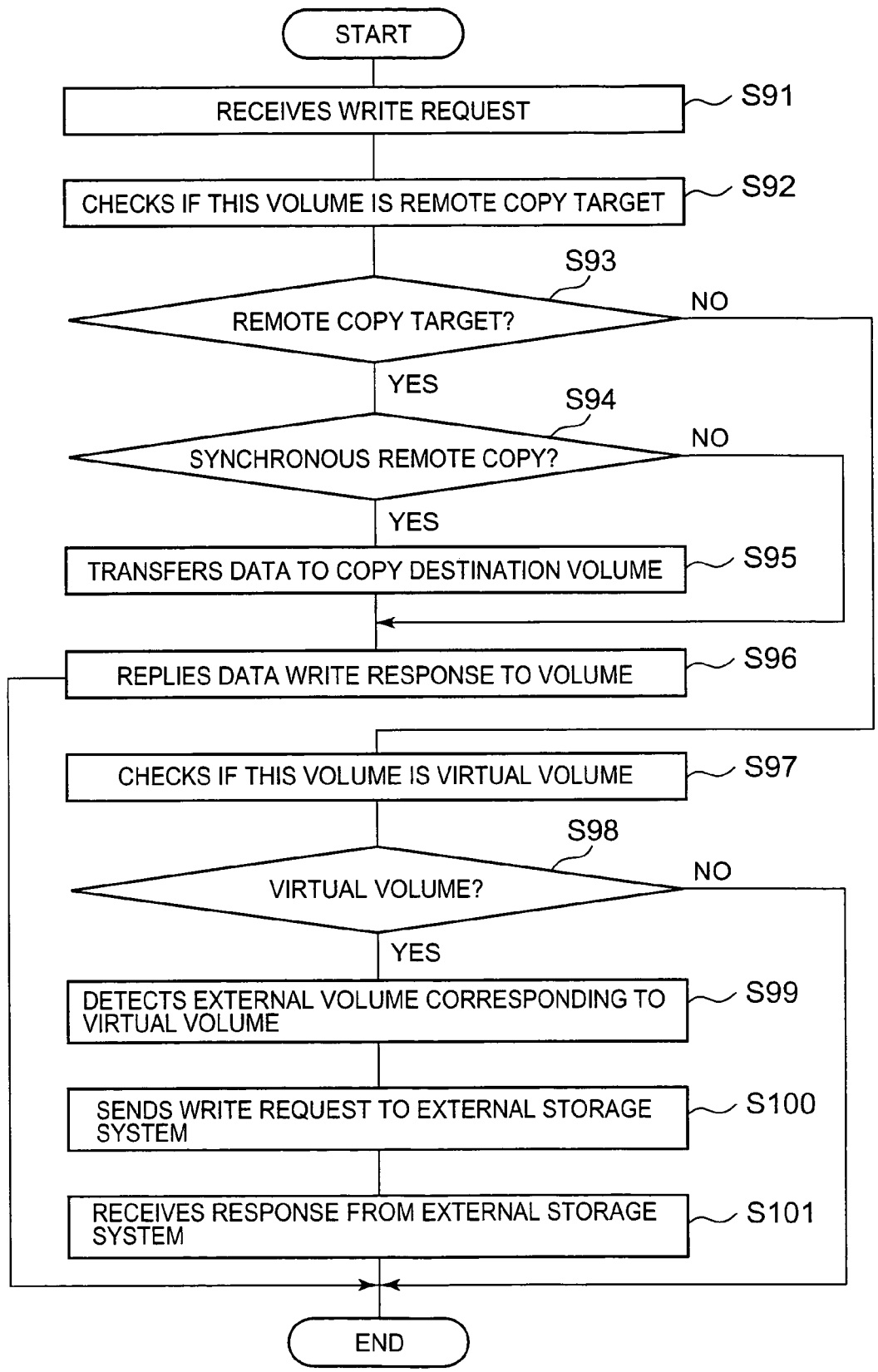
FIG. 12 is a flow chart depicting an example of the remote copy processing.

FIG. 12 shows an example of the flow of the remote copy processing.

When the write request (see FIG. 6B) is received (S91), the control CPU 23 refers to the copy volume management table 66, and checks whether this volume specified by the write request is the remote copy target (S92). Specifically the control CPU 23 refers to the copy volume management table 66, for example, and checks whether this volume is the copy source volume. Or the management CPU 13 or the control CPU 23 sets the path ID of the currently selected path (e.g. the path ID before changing to the alternate path detected in the processing in FIG. 9) in the memory 27 in advance, for example, and the control CPU 23 refers to the path management table 67A, and identifies the type between 1 and 2 in the record including the path ID, and checks whether the identified type is "remote".

If the result of S92 is the remote copy target (YES in S93), the control CPU 23 checks whether the remote copy is a synchronous type (S94), and if it is a synchronous type (YES in S94), the control CPU 23 immediately transfers the write target data to the copy destination volume (S95), and returns the write response to the source which issued the write request in S91 (S96). If, the remote copy is an asynchronous type (YES in S94) in S94, then the control CPU 23 stores the write target data in the write request received in S91 in the above mentioned side file, and executes S96 without executing S95.

If the result in S92 is not the remote copy target (NO in S93), the control CPU 23 refers to the external volume management table 64, and checks whether this volume specified by the write request is a virtual volume (S97). If the result is a virtual volume (YES in S98), the control CPU 23 detects an external volume corresponding to the virtual volume in the external volume management table 64 (S99), and issues a write request including the ID of the external volume to the external storage system (S100). Then the control CPU 23 receives the response (e.g. write completion report) of this write request from the external storage system (S101).

According to the above mentioned embodiment, a new storage control technology using the common aspect of the external connection and the remote copy can be provided. In other words, the first path via the second storage system 33B and the second path via the third storage system 33C are provided between the virtual volume 69A of the first storage system 33A and the internal volume 68D of the fourth storage system 33D. Which one of the first path and the second path is used is selected by the management server 11 or by the first storage system 33A, and if a data write request is issued for the virtual volume 69A, this data can be written in the internal volume 68D via the selected path.

According to the above mentioned embodiment, a path is selected based on the connection status between the storage systems and the load status of the paths. Specifically after the first path is selected, the management server 11 or the storage system 33A collects the connection status and the load of each path, for example, and switches the first path to the second path when it is judged that a failure occurred to the first path (e.g. failure occurred in the storage system 33B) and/or the load of the second path is lower than the load of the first path. Then according to the second path, the write target data to the virtual volume 69A is stored in the internal volume 68D. By this, a drop in throughput of the storage control system (data amount that can be written in the internal volume 68D in unit time) can be suppressed.

Preferred embodiments of the present invention were described above, but these are merely examples to describe the present invention, and restrict only these embodiments and not the scope of the present invention. The present invention can be embodied in various other modes.

Figure 13A:
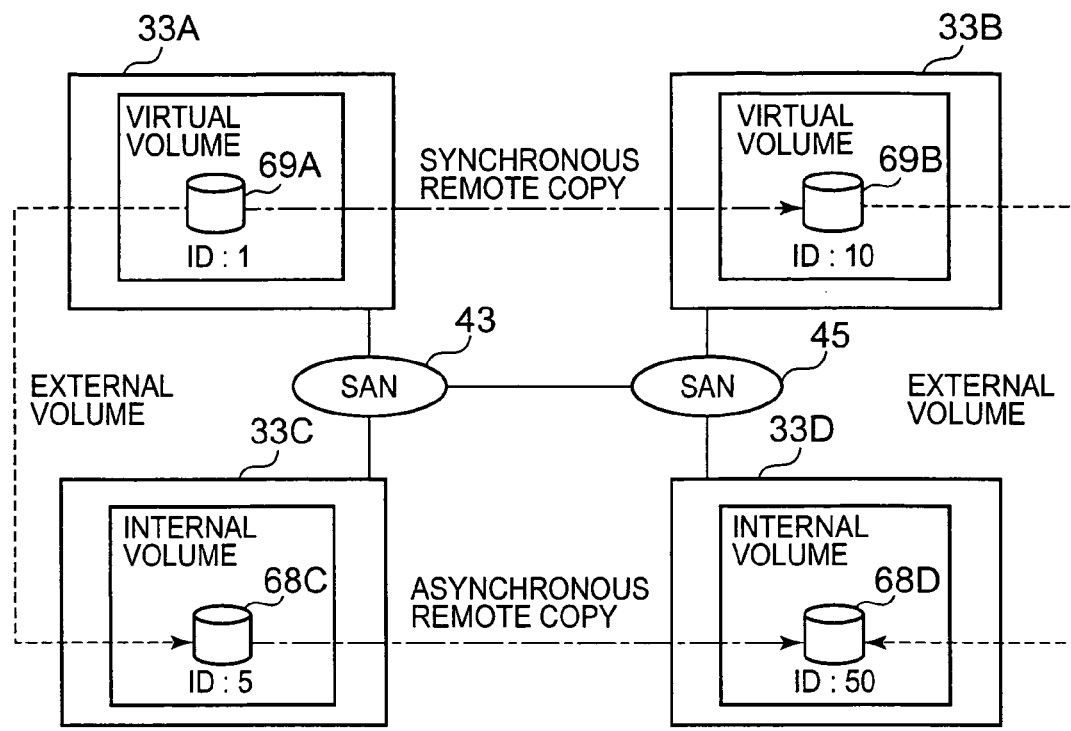
FIG. 13A is a diagram depicting one processing executed in the storage control system according to another embodiment of the present invention.
Figure 13B:
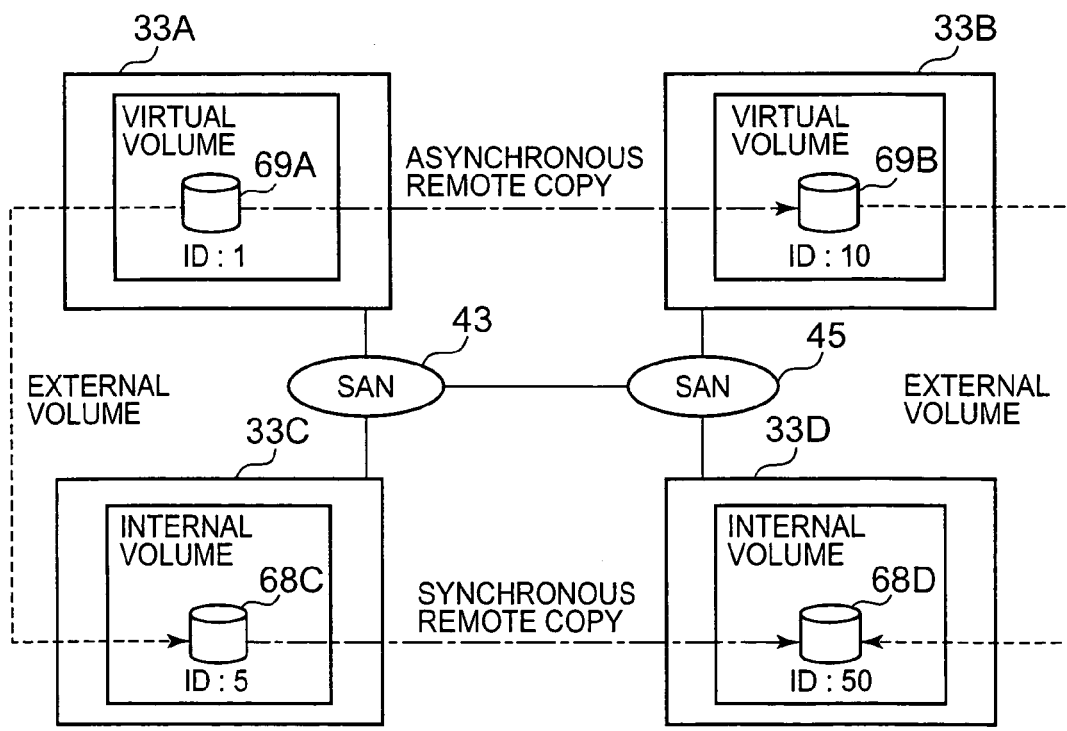
FIG. 13B is a diagram depicting another processing executed in the storage control system according to an embodiment of the present invention.

For example, as FIG. 13A and FIG. 13B show, remote copy may be performed using both the first path and the second path. In this case, the selection of the first path and the second path depends on the selection of the remote copy type. For example, as FIG. 13A shows, if the first path is selected, synchronous remote copy may be performed in the first path, and asynchronous remote copy may be performed in the second path, for example. In the same way, as FIG. 13B shows, if the second path is selected, synchronous remote copy may be performed in the second path, and asynchronous remote copy may be performed in the first path, for example. The remote copy type of the first path and the second path may be switching during operation of the storage control system, for example (in other words, FIG. 13A and FIG. 13B may be inter-switched). Also if it is judged that the load of the second path is lower than the load of the first path in FIG. 13A, for example, asynchronous remote copy may be performed in the first path, and synchronous remote copy may be performed in the second path, as shown in FIG. 13B.

Figure 14A:
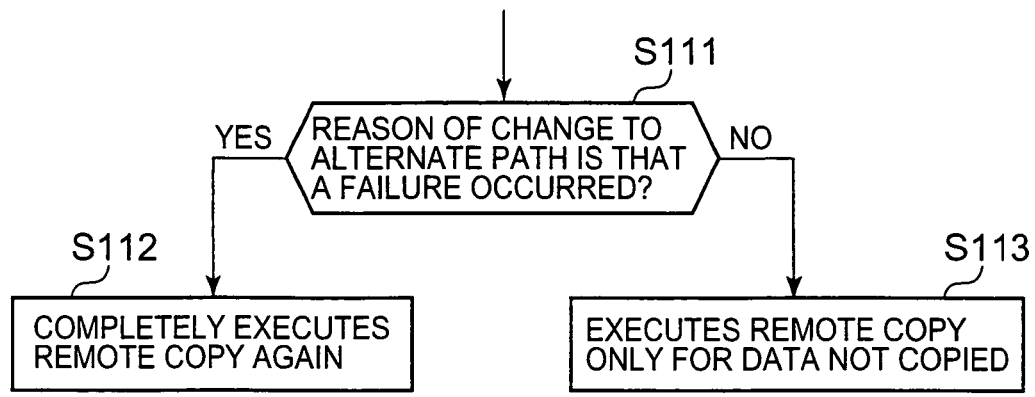
FIG. 14A is a flow chart depicting an example of one processing executed in the storage control system according to still another embodiment of the present invention.

Also as FIG. 14A shows, if switching to the alternate path is performed, and if the cause of this switching is that a connection failure occurred (YES in FIG. 111), remote copy may be completely executed again (S112), and if the switching was performed because of another reason, such as a high load (NO in S111), then remote copy may be performed only for uncopied data (S113). Specifically the first storage system 33A manages the data transferred to the storage systems 33B and 33C and the untransferred data, for example, and if YES in S111, transferred data may be transferred according to the alternate path. If NO in S111, on the other hand, the first storage system 33A may transfer only the untransferred data according to the alternate path.

Figure 14B:
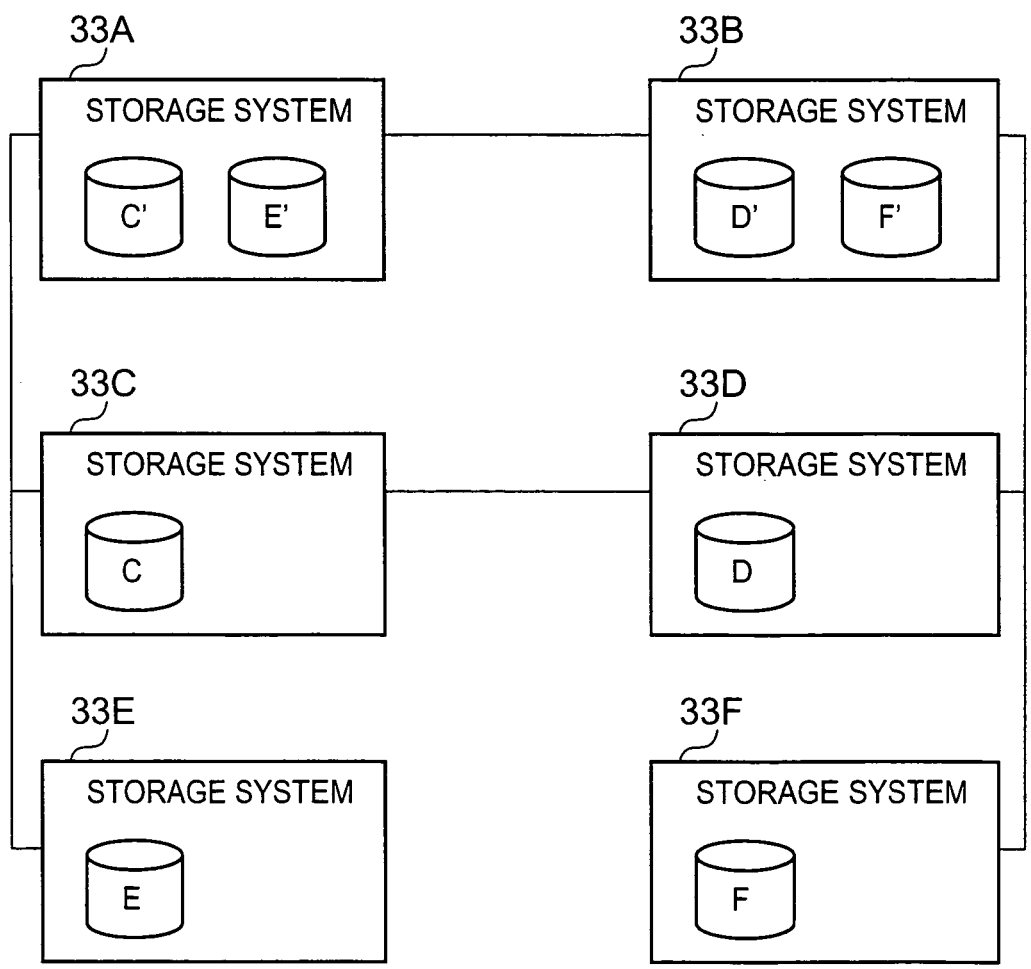
FIG. 14B is a diagram depicting a configuration example of the storage control system according to still another embodiment of the present invention.

Also each storage system 33A and 33B, for example, can write data to two or more storage systems according to the external connection. For example, as FIG. 14B shows, the fifth storage system 33E having the external volume E corresponding to the virtual volume E' may be connected to the first storage system 33A. Also the sixth storage system 33F, having the external volume F corresponding to the virtual volume F', may be connected to the second storage system 33B. In this case, for the path of the remote copy between the external volumes E and F, the path "33A→33B→33F" and the path "33A→33C→33D→33F", for example, may be selectively used.

Figure 15:
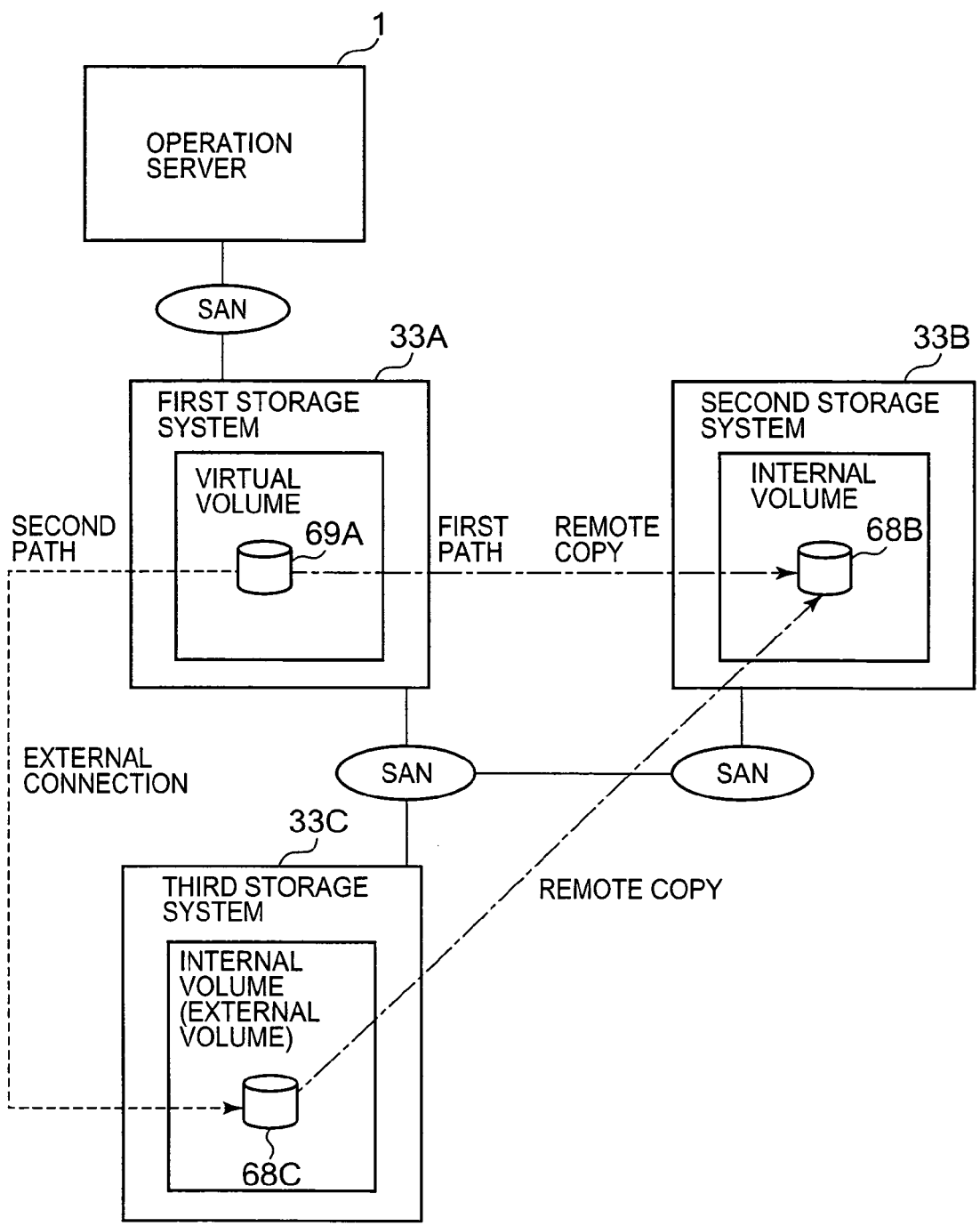
FIG. 15 is a diagram depicting the storage control system according to still another embodiment of the present invention.

Also the storage control system may be comprised of three storage systems, for example, as shown in FIG. 15. Here the path "33A→33C→33B" and the path "33A→33B" may be selectively used. In this case, if the connection type to the third storage system 33C is recognized as "external", the first storage system 33A can provide the external volume 68C, which corresponds to the virtual volume 69A, to the operation server 1. On the other hand, if the connection type to the second storage system 33B is recognized as "remote", the first storage system 33A does not provide the internal volume 68B, which corresponds to the virtual volume 69A, to the operation server 1.

What is claimed is:

1. A storage control method, in which there are three or more storage systems comprises first, second and third storage systems,
   wherein said first storage system comprises a first volume which is a virtual logical volume, said second storage system comprises a second volume which is an actual volume and corresponds to said first volume, such that when said first storage system receives a write request designating said first volume, target data following the write request is transferred to said second storage system to be written in said second volume, and said third storage system comprises a third volume which is an actual volume, the storage control method comprising the steps of:
   (A) finding first and second paths for satisfying the following conditions (1) to (4)
      (1) said first storage system is a storage system which is a start point of the first and second paths,
      (2) said second volume is a copy source volume,
      (3) said third volume is a copy destination volume,
      (4) said third storage system having said copy destination volume is a copy destination storage system, and
   wherein said first path connects said first volume to said copy destination volume not via said copy source volume and said second path connects said first volume to said copy destination volume via said copy source volume,
   (B) selecting at least one path from said first and second paths;
   (C) receiving a write request designating said first volume;
   (D) executing an external connection processing for writing said write target data which follows said received write request to said copy source volume which corresponds to said first volume, or a remote copy processing for writing said write target data to be written in said first volume to said copy destination volume or a virtual volume which corresponds to said copy destination volume, such that said write target data is written to said copy source volume and to said copy destination volume via said selected path;

wherein each storage system stores connection destination information, wherein said connection destination information includes an ID of a connection destination storage system which is a transmission destination of the write target data, and a connection type which indicates which one of the external connection processing and the remote copy processing is used to transmit the write target data to the connection destination storage system, and wherein based on said connection destination information of each storage system, said first and second paths are found in said step (A); and wherein in said step (A), (a1) if said connection type included in said connection destination information in said start point storage system indicates said external connection processing, identifying said second storage system from said connection destination storage system ID corresponding to said connection type indicating said external connection processing, finding said connection type indicating said remote copy processing from said connection destination information in said identified second storage system, checking whether a connection destination storage system ID corresponding to said connection type indicating said remote copy processing is identical with said copy destination storage system ID, and as a result, if they are identical with each other, said second path is recognized, (a2) if said connection type included in said connection destination information in said start point storage system indicates said remote copy processing, checking whether said connection destination storage system ID corresponding to said connection type indicating said remote copy processing is identical with said copy destination storage system ID, and as a result, if they are identical with each other, said first path is recognized, and if they are different, identifying said storage system from said connection destination storage system ID corresponded to said connection type indicating said remote copy processing, finding said connection type indicating said external connection processing from said connection destination information in said identified storage system, checking whether said connection destination storage system ID corresponding to the connection type indicating said external connection processing is identical with said copy destination storage system ID, and as a result, if they are identical with each other, said first path is recognized.

2. The storage control method according to claim 1, wherein a connection status of at least said selected path, out of said first and second paths, is recognized, and said selected path is switched to another path according to said recognized connection status.

3. The storage control method according to claim 1, wherein a load of each of said first and second paths is recognized, and said selected path is switched to another path according to each of said recognized load.

4. The storage control method according to claim 1, further comprising the steps of:
managing whether the write target data is data for which said remote copy processing has completed or not;
recognizing a connection status of at least said selected path of said first and second paths;
recognizing a load of each of said plurality of paths;
switching said selected path to another path according to at least one of said recognized connection status or each load; and after switching the path, performing the remote copy processing again for the write target data for which said remote copy processing has completed if the path is switched according to said connection status, and performing remote copy processing on the write target data for which said remote copy processing has not completed if the path is switched according to each of the loads.

5. The storage control method according to claim 1, wherein
in said first and second paths, both of a synchronous remote copy, which executes the remote copy processing synchronously with the processing of the write request to the copy source volume, and an asynchronous remote copy, which executes the remote copy processing asynchronously with the processing of the write request to the copy source volume, are executed.

6. The storage control method according to claim 1, wherein when said first path is switched to said second path after said first path is selected, said start point storage system transmits a request for executing remote copy to said copy destination volume from said copy source volume to said second storage system and, in response to the request, said second storage system copies data to said copy destination volume from said copy source volume.

7. A storage system including a first storage system in which three or more storage systems comprise said first storage system, a second storage system and a third storage system, comprising:
a first controller; and
a first volume which is a virtual logical volume;
wherein:
said second storage system comprises a second controller, and a second volume which is an actual volume and corresponds to said first volume, such that when said first controller receives a write request designating said first volume, write target data following the write request is transferred to said second storage system to be written in said second volume, and said third storage system comprises a third controller and a third volume which is an actual volume; and
first and second paths that satisfy the following conditions (1) to (4)
(1) said first storage system is a storage system which is a start point of the first and second paths,
(2) said second volume is a copy source volume,
(3) said third volume is a copy destination volume,
(4) said third storage system having said copy destination volume is a copy destination storage system,
and wherein said first path connects said first volume to said copy destination volume not via said copy source volume and said second path connects said first volume to said copy destination volume via said copy source volume;
wherein said first controller comprises
a receiving module configured to receive a write request designating said first volume;
an executing module configured to transmit said write target data and a remote copy request designating said copy destination volume or a virtual volume corresponding to said copy destination volume, when said first path is selected, and
a transmitting module configured to transmit a request for executing a remote copy from said copy source volume to said copy destination volume, when said first path is switched to said second path;

wherein an external connection processing is for writing said write target data which follows said write request to said copy source volume which corresponds to said first volume, and wherein a remote copy processing is for writing said write target data to be written in said first volume to said copy destination volume or said virtual volume which corresponds to said copy destination volume, such that said write target data is written to said copy source volume and to said copy destination volume via said selected path;

wherein each storage system stores connection destination information, wherein said connection destination information includes an ID of a connection destination storage system which is a transmission destination of the write target data, and a connection type which indicates which one of the external connection processing and the remote copy processing is used to transmit the write target data to the connection destination storage system, and wherein based on said connection destination information of each storage system, said first and second paths that satisfy the conditions (1) to (4) are found; and wherein said first and second paths are found further according to the following (a1) if said connection type included in said connection destination information in said start point storage system indicates said external connection processing, identifying said second storage system from said connection destination storage system ID corresponding to said connection type indicating said external connection processing, finding said connection type indicating said remote copy processing from said connection destination information in said identified second storage system, checking whether a connection destination storage system ID corresponding to said connection type indicating said remote copy processing is identical with said copy destination storage system ID, and as a result, if they are identical with each other, said second path is recognized, (a2) if said connection type included in said connection destination information in said start point storage system indicates said remote copy processing, checking whether said connection destination storage system ID corresponding to said connection type indicating said remote copy processing is identical with said copy destination storage system ID, and as a result, if they are identical with each other, said first path is recognized, and if they are different, identifying said storage system from said connection destination storage system ID corresponded to said connection type indicating said remote copy processing, finding said connection type indicating said external connection processing from said connection destination information in said identified storage system, checking whether said connection destination storage system ID corresponding to the connection type indicating said external connection processing is identical with said copy destination storage system ID, and as a result, if they are identical with each other, said first path is recognized.

8. The storage system according to claim 7, wherein when said first path is switched to said second path after said first path is selected, said start point storage system transmits a request for executing remote copy to said copy destination volume from said copy source volume to said second storage system and, in response to the request, said second storage system copies data to said copy destination volume from said copy source volume.

9. A management server for managing three or more storage systems comprising first, second and third storage systems, wherein said first storage system comprises a first volume which is a virtual logical volume, said second storage system comprises a second volume which is an actual volume and corresponds to said first volume, such that when said first storage system receives a write request designating said first volume, write target data following the write request is transferred to said second storage system to be written in said second volume, and said third storage system comprises a third volume which is an actual volume, said management server comprises:

a finding module configured to find first and second paths that satisfy the following conditions (1) to (4)

(1) said first storage system is a storage system which is a start point of the first and second paths, (2) said second volume is a copy source volume, (3) said third volume is a copy destination volume, (4) said third storage system having said copy destination volume is a copy destination storage system, and wherein said first path connects said first volume to said copy destination volume not via said copy source volume and said second path connects said first volume to said copy destination volume via said copy source volume; and a selecting module configured to select at least one path from said first and second paths;

wherein an external connection processing is for writing said write target data which follows said write request to said copy source volume which corresponds to said first volume, and wherein a remote copy processing is for writing said write target data to be written in said first volume to said copy destination volume or a virtual volume which corresponds to said copy destination volume, such that said write target data is written to said copy source volume and to said copy destination volume via said selected path;

wherein each storage system stores the connection destination information, wherein said connection destination information includes an ID of a connection destination storage system which is a transmission destination of the write target data, and a connection type which indicates which one of external connection processing and remote copy processing is used to transmit the write target data to the connection destination storage system, and wherein said finding module finds said first and second paths based on said connection destination information of each storage system; and wherein said finding module finds said first and second paths further according to the following (a1) if said connection type included in said connection destination information in said start point storage system indicates said external connection processing, identifying said second storage system from said connection destination storage system ID corresponding to said connection type indicating said external connection processing, finding said connection type indicating said remote copy processing from said connection destination information in said identified second storage system, checking whether a connection destination storage system ID corresponding to said connection type indicating said remote copy processing is identical with said copy destination storage system ID, and as a result, if they are identical with each other, said second path is recognized, (a2) if said connection type included in said connection destination information in said start point storage system indicates said remote copy processing, checking whether said connection destination storage system ID corresponding to said connection type indicating said remote copy processing is identical with said copy destination storage system ID, and as a result, if they are identical with each other, said first path is recognized, and if they are different, identifying said storage system from said connection destination storage system ID corresponded to said connection type indicating said remote copy processing, finding said connection type indicating said external connection processing from said connection destination information in said identified storage system, checking whether said connection destination storage system ID corresponding to the connection type indicating said external connection processing is identical with said copy destination storage system ID, and as a result, if they are identical with each other, said first path is recognized.

10. The management server according to claim 9, wherein the selecting module is configured to recognize a connection status of at least said selected path, out of said first and second paths, and to switch said selected path to another path according to said recognized connection status.

11. The management server according to claim 9, wherein the selecting module is configured to recognize a load of each of said first and second paths, and to switch said selected path to another path according to each of said recognized loads.

12. The management server according to claim 9, wherein the selecting module is configured to:

recognize a connection status of at least said selected path of said first and second paths;

recognize a load of each of said plurality of paths; and switch said selected path to another path according to at least one of said recognized connection status or each load.

* * * * *